(12) United States Patent
Elizalde

(10) Patent No.: US 11,002,585 B2
(45) Date of Patent: May 11, 2021

(54) LIQUID FLOW INDICATOR DEVICE AND METHOD OF USE

(71) Applicant: Juan Carlos Elizalde, Perris, CA (US)

(72) Inventor: Juan Carlos Elizalde, Perris, CA (US)

( * ) Notice: Subject to any disclaimer, the term of this patent is extended or adjusted under 35 U.S.C. 154(b) by 0 days.

(21) Appl. No.: 16/710,087

(22) Filed: Dec. 11, 2019

(65) Prior Publication Data

US 2020/0292369 A1    Sep. 17, 2020

Related U.S. Application Data

(60) Provisional application No. 62/817,175, filed on Mar. 12, 2019.

(51) Int. Cl.
| | |
|---|---|
| *G01F 1/05* | (2006.01) |
| *G01F 15/06* | (2006.01) |
| *G01F 1/28* | (2006.01) |
| *G01F 1/22* | (2006.01) |
| *G01F 1/26* | (2006.01) |
| *G01F 23/02* | (2006.01) |
| *G01F 23/00* | (2006.01) |

(52) U.S. Cl.
CPC ............... *G01F 23/02* (2013.01); *G01F 1/05* (2013.01); *G01F 1/22* (2013.01); *G01F 1/26* (2013.01); *G01F 1/28* (2013.01); *G01F 15/06* (2013.01); *G01F 23/0015* (2013.01)

(58) Field of Classification Search
CPC ... G01F 23/02; G01F 1/22; G01F 1/24; G01F 1/26; G01F 1/28; G01F 1/52
See application file for complete search history.

(56) References Cited

U.S. PATENT DOCUMENTS

| | | | | |
|---|---|---|---|---|
| 4,993,460 | A * | 2/1991 | Robinson | ................. B67D 7/42 116/273 |
| 5,244,017 | A * | 9/1993 | Hartman | .............. B67D 7/0478 116/273 |
| 5,577,538 | A * | 11/1996 | Sunderhaus | ............. B67D 7/56 141/94 |
| 6,192,548 | B1 * | 2/2001 | Huffman | ................. A47L 5/225 15/320 |

\* cited by examiner

*Primary Examiner* — Paul M. West
(74) *Attorney, Agent, or Firm* — Grants Law Firm; Allan Grant

(57) ABSTRACT

A Liquid Flow Indicator Device comprising: a sight glass having one or more cages positioned around the sight glass for containing one or more indicator objects, so a user can see the indicator objects, which are visible to the user looking through the sight glass, thereby providing visual notification to the user. When the liquid is flowing through the cages and also the sight glass, the indicator objects will float around inside the cage, thereby providing visual notification to the user that the liquid is flowing through the cage and the sight glass. The indicator objects can also make a sound when the liquid flows through the sight glass and through the cage by banging around inside the cage, thereby providing audio notification to the user that the liquid is flowing through the sight glass. As such, this invention provides Audio notifications and/or Visual notifications regarding the flow of liquid. A fluid transport system and a method of using the device.

12 Claims, 17 Drawing Sheets

LIQUID FLOW INDICATOR DEVICE AND METHOD OF USE

CROSS-REFERENCE TO RELATED APPLICATIONS

The present application claims priority under 35 U.S.C. 119(e) and under all applicable U.S. statutes and regulations, to U.S. Provisional Application Ser. No. 62/817,175, filed on Mar. 12, 2019. The disclosure of which is hereby incorporated herein by reference in its entirety.

FIELD OF THE INVENTION

This invention relates in general to a liquid flow indicator device and method of use, and in particular, the present disclosure relates to fuel delivery systems for tankers containing gas and diesel, but it can also be used to indicate the flow of fluid in automotive, heavy equipment, truck, and bus engine applications including the servicing of power steering, cooling, hydraulic, and air conditioning systems as well as many other deliveries such as alcohol, antifreeze, oil etc.

BACKGROUND OF THE INVENTION

With the rise in oil production and the need for carrying this precious commodity, wasting it becomes an unacceptable practice for the oil production companies. The Environmental Protection Agency (EPA) has regulations on preventing oil spills, and oil shipping companies have to obey and act in the best interest of these regulations.

In recent years, reports have shown that an estimate of 18,000-24,000 oil spills occur from the production, storage, transport, and use of oil, and about 10-25 million gallons of oil are spilled yearly. These oil spills not only affect the companies in terms of monetary loss, but they also can release toxins into our environment, threatening public health and safety and damaging wildlife habitats.

With the increased oil production in the U.S. in particular, transporting this commodity becomes crucial in order to refine the extracted oil substances into various by-products. The methods of transporting oil can vary from air, sea, and land but the most efficient and cost effective method is through sea transportation. Unfortunately, there are many situations which require oil, or other liquids, such as hazardous, volatile, and/or flammable liquids, gasoline, fuels, fuel oil, chemicals, etc., to be transported over land, and this requires trucks equipped with large tanks to be utilized. These trucks, also known simply as tankers, require that specific measures of safety and precision be taken in order to deliver the oil to its destination whether it's a local gas station, refinery, or factory fuel supply.

Some tankers (e.g., sometimes called cargo tankers) might carry up to about 11000 gallons, for example, but this may vary based on the type and size of the tankers. The EPA has certain requirements that must be obeyed by tankers, for example collection efficiency should be assumed to be 98.7 percent. This means that for tanker trucks without leakage, the tanker should not be filled to 100 percent of its capacity.

A tanker-type truck is conventionally utilized to transport fuel from storage depots to various service stations. Typically, the tanker is divided into a plurality of containers holding various types of fuel. A sight glass is preferably provided in the discharge tube from the tanker so that the flow of fuel may be directly observed by the tanker driver when discharging the fuel into the storage tanks at the service station. In this way, the tanker driver can check that fuel is flowing through the tube, as well as confirm the type of fuel flowing therethrough.

One type of sight glass currently utilized for this purpose is composed of a solid clear cast acrylic substance formed in the shape of a ring. The clear acrylic ring is then fastened between a pair of flanges conventionally found in a connection between two sections of the tanker discharge tube. In this way, fuel flows through the hollow interior of the clear acrylic ring for viewing by the tanker driver.

It is not uncommon to find additives mixed in with conventional fuel products in order to raise the octane level of the fuel. Such additives, such as MTBE, have been found to dissolve, craze, or optically cloud the acrylic material, thereby reducing the effectiveness of the material as a sight glass. Acrylic is preferred material for use as a sight glass in fuel lines, since the material is clear, yet more resistant to breakage than glass.

It is therefore a general object of the present invention to provide an improved sight glass device for fuel lines.

Tanker drivers while delivering liquid products have no knowledge of product flow. Once the driver connects all of the hoses and opens the main internal valve on the tanker, the fuel begins to flow. There is no way to know what really is happening, other than a slight view through an acrylic sight glass that is approximately 2" thick. Under really good lighting and a new slight glass, the driver can see there is the liquid flowing from the tank. But, with bad lighting and an old sight glass that are discolored/yellowed, the driver can only guess, by picking up the hose to see if it is full. It is basically a blind process.

Unfortunately, the industry is plagued with this issue. As such, there is a need in the art for new device and a new way to help tanker driver better identify when liquid is flowing and when the liquid has stop flowing, so the tanker driver can be sure that there is no liquids that were accidently left on the tanker. Additionally and most importantly, we need to prevent cross contamination and/or over fills while loading at a local gas station, refinery, or factory fuel supply.

This new device is a simple addition to existing fixtures that allows the driver to see as well as now be able to hear that the liquid is flowing and that his lines are full with product moving as well as being able to hear when the liquid has stop flowing.

It is an object of this new device to allow the tanker drivers to have full knowledge that the product is moving in the hose and stopping him/her from prematurely closing the internal valve until all of the liquid has been transferred and it is complete.

It is an object of this new invention to create a new device that is very simple and helps solve a problem tanker driver have continuously had that was supposedly solve with high priced electronics that claim to service this same issue, but were not effective.

Most importantly with this device is the knowledge that it transfers to the tanker driver of what is going on during the transfer of liquids, which has never been fully addressed by the prior inventions.

This new invention allows tanker drivers to see an object inside the sight glass, a novel point. With this invention the driver can see one or more indicator balls bouncing around in the flow of liquid. A second novel point is that the balls bounce against an aluminum screen, making a distinct noise, an audible sound that the driver can hear. Similar to a popcorn and/or a rattling noise, that allows them to hear liquid flowing. There has never been a product with an audible response in the industry. While unloading at night or in inclement weather, being able to hear and knowing that the fuel is flowing is an incredible safety feature.

It is an object of this new device to position it in the sight glass pinched between the flanges and position it between the piping that leaves the internal valve and ends at the final shut off butterfly valve and folded into the sight glass pinched between the flanges.

It is a further object of this device to create a cage made of aluminum or stainless steel or similar material and hold one or more balls like marbles that are not effected by the material being transferred and contained inside the sight glass holding these balls into the flow of product. When the product is flowing, these balls bounce and bang against the cage in the flow. The driver can see the balls bouncing, due to they are a different color than the product. While they are bouncing, they are making this very unique sound, a rattle and/or tinkling noise that is never before heard while moving liquids. This alone is a novel invention that has never been introduced before.

As such, there is a need in the art for an invention that provides a device that enhances Audio and Visual notifications to users regarding the flow of liquid.

SUMMARY OF THE INVENTION

Accordingly, it is an object of this invention to provide a system and method for helping tanker driver better identify when liquid is flowing through a tube and when the liquid has stop flowing, so the tanker driver can be sure that there is no liquids that were accidently left on the tanker as well as prevent cross contamination and/or over fills.

It is an object of this invention to utilize a device that enhances Audio and/or Visual notifications to users regarding the flow of liquid.

It is another object of this invention to utilize a new device that allows the driver to see as well as now be able to hear that the liquid is flowing and that his lines are full with product moving as well as being able to hear when the liquid has stop flowing.

It is a further object of this invention to be able to transfers to the tanker driver the full knowledge of what is going on during the transfer of liquids, that the product is moving in the hose and/or stopped moving and stopping him/her from prematurely closing the internal valve until all of the liquid has been transferred and it is complete.

It is another object of the present invention is to provide a new and improved sight glass which utilize a cage/screen containing one or more indicator balls that are positioned in the center of the sight glass where liquid typically flow through.

It is one of the primary objects of the present invention to be able to utilize the level feature for the visual of the product in plumbing of such compartment is achieved by observation of the balls. Wherein, if the balls are floating at the top of sight glass inside such cage, meaning that the compartment has product in it. Wherein, if balls are at the bottom of cage it indicates plumbing is empty and compartment should have no product in it It is an object of this invention to utilize a cage/screen containing one or more indicator balls that are positioned in the sight glass.

It is an object of this invention to allows tanker drivers to see an object inside the sight glass, a novel point, so the tanker drivers can quickly and easily determine whether liquid is flowing by seeing the object move.

It is still yet another object of this invention to utilize one or more indicator balls that will bounce around when liquid is flowing.

It is an object of this invention to utilize one or more indicator balls that bounce against a cage/screen thereby making a distinct noise similar to popcorn and/or a rattling noise, which allows the user to hear liquid flowing, a second novel point.

It is an object of this invention to utilize sight glass pinched between the flanges and positioned between the piping that leaves the internal valve and ends at the final shut off butterfly valve and folded into the sight glass pinched between the flanges.

It is an object of the invention that the device create a cage/screen made of aluminum or stainless steel or similar material.

It is also object of this invention to utilize a cage/screen made of aluminum or stainless steel or similar material that can hold one or more indicator balls like marbles that are not effected by the material being transferred and contained inside the sight glass holding these balls into the flow of product.

It is an object of this invention to utilize one or more indicator objects that will bounce and bang against the cage/screen when the liquid flows through the sight glass containing the cage/screen. While they are bouncing, they are making this very unique sound, a rattle and/or tinkling noise that typically has never been heard before while moving liquids.

It is an object of this invention to utilize one or more indicator balls of different color for view in the sight glass to provide an eye catching notification to the user as to whether fluid is flowing from the tanker to the storage unit.

In the preferred embodiment, it is an object of the invention that the device be constructed like a taco shape cage made of aluminum or stainless steel or similar material, which this cage system should be positioned towards top of the sight glass, wherein one or more indicator balls are folded inside as a taco that is positioned inside the sight glass, holding these balls into the flow of product.

In an alternative embodiment, it is an object of the invention to provide a cage/screen that is positioned inside a portion of the center part of the sight glass, wherein one or more indicator balls are contained inside the sight glass, holding these balls into the flow of product.

In yet another alternative embodiment, it is an object of the invention to provide a cage/screen that is positioned inside the entire center of the sight glass, wherein one or more indicator balls are contained inside the sight glass, holding these balls into the flow of product.

It is an object of this invention to provide a method of use for the tanker driver can check that fuel is flowing through the tube by providing a tanker, a tube, a sight glass, a cage, one or more indicator objects contained in said cage that is positioned inside said sight glass; wherein before said fluid is turn on by said user to passed through said tube, said sight glass and said cage said indicator objects are sitting still at the bottom of the cage and in the inside of the sight glass thereby indicating that said fluid is not yet flowing through said tube that is connect to sight glass and said cage; wherein when fluid is passed through said tube, said sight glass and said cage then said indicator objects bouncing around the cage in the flow of liquid thereby indicating said fluid is flowing; wherein when fluid has completely passed through said tube, said sight glass and said cage then said indicator objects will not bouncing around said cage and will be sitting still at the bottom of the cage and in the inside of the sight glass, thereby indicating that fluid is nolonger flowing through said tube and said sight glass and said cage.

It is another object of this invention to work on various liquids that are transferred by tanker transport, for such liquids as gasoline and diesel to filling stations. Additionally, this invention can also transport a wide variety of other liquid goods such as liquid sugar, molasses, milk, wine, juices, water, and industrial chemicals.

It is an object of this invention to create a device that is easy to manufacture, reliable in operation, and relatively inexpensive to produce.

These and further objects of the invention will become apparent to those skilled in the relevant art and after a study of the present disclosure of the invention.

In addition to the above objects, various other objects of this invention will be apparent from careful reading of this specification including the detail description contained herein below.

BRIEF DESCRIPTION OF DRAWINGS

These as well as other features of the present invention will become apparent upon reference to the accompanying drawings wherein like numerals designate corresponding parts in the several figures, summarized as follows:

FIG. 9 is a close up view of the fuel connections for the tanker having a housing of this invention for liquid to flows through.

Other features and advantages of the invention will become apparent from the following detailed description, taken in conjunction with the accompanying drawings, which illustrate, by way of example, various features of embodiments of the invention.

DETAIL DESCRIPTION OF PREFERRED EMBODIMENT

The following detailed description and accompanying drawings are provided for purpose of illustrating and describing precisely the preferred embodiments of the present invention and are not intended to limit the scope of the invention in anyway. It will be understood that various changes in the details, materials arrangements of parts or operational conditions which have been herein described and illustrated in order to explain the nature of the invention may be made by those skilled in the art within the principles and scope of this invention.

Figure 1A:
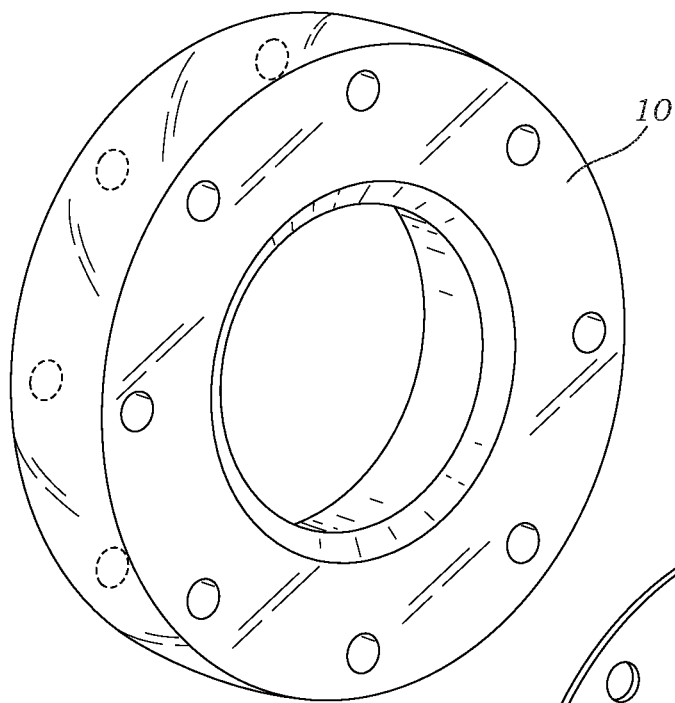
FIG. 1A is a sight glass.
Figure 1B:
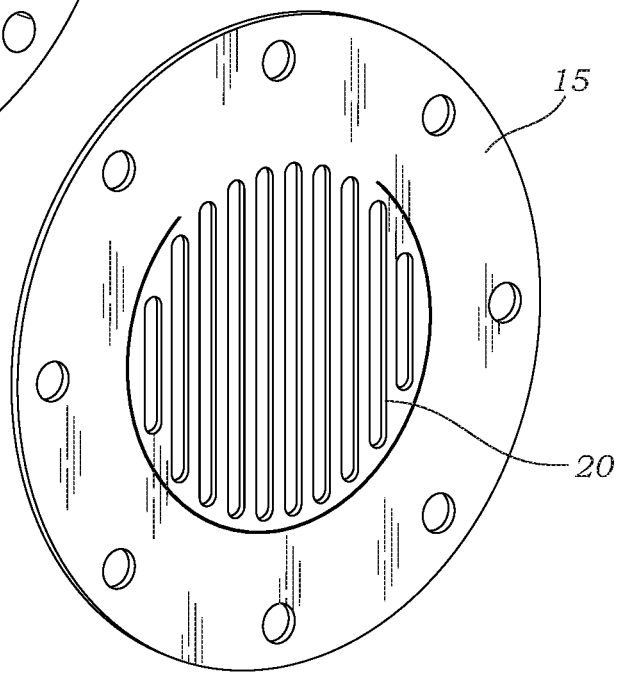
FIG. 1B is a flange with a cage wall.
Figure 1C:
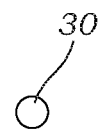
FIG. 1C is an indicator object.

FIGS. 1-28 show the preferred embodiment of the invention as well as some alternative embodiments of the invention. FIG. 1A is a sight glass 10. FIG. 1B is a flange 15 with a cage wall 20. FIG. 1C is an indicator object 30.

Figure 2:
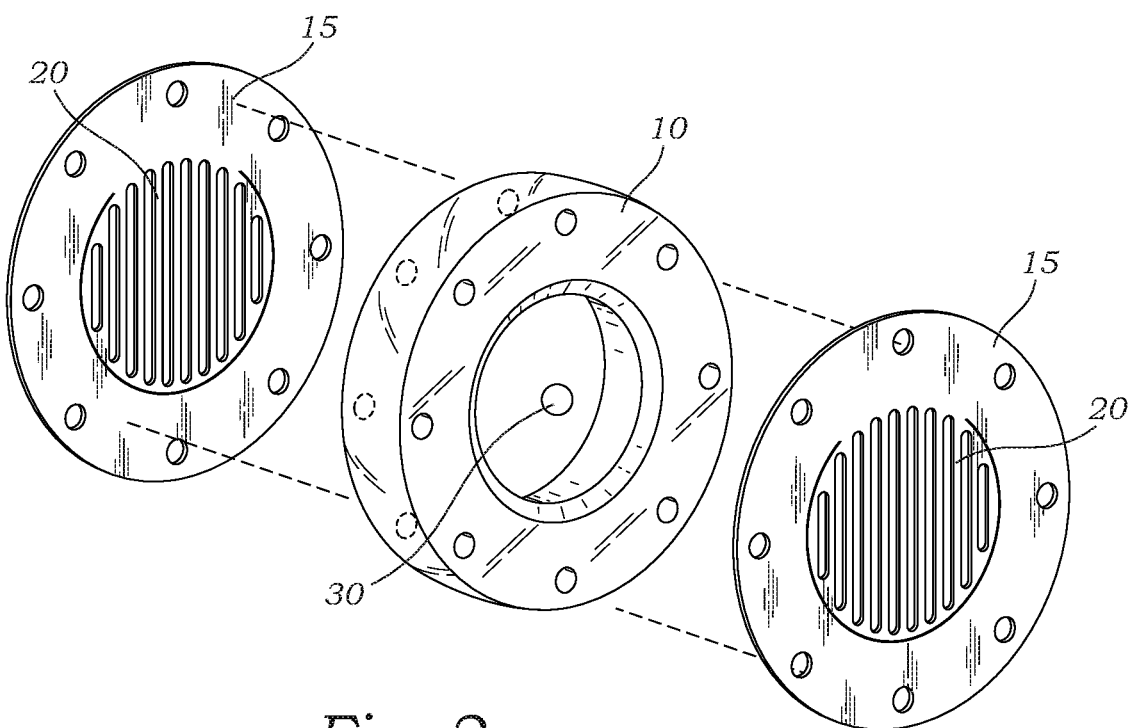
FIG. 2 is an exploded view of an alternative embodiment of the invention showing the sight glass, seals, flanges and one or more indicator objects contained in said sight glass between the two flanges to create a cage for containing said indicator object.
Figure 3:
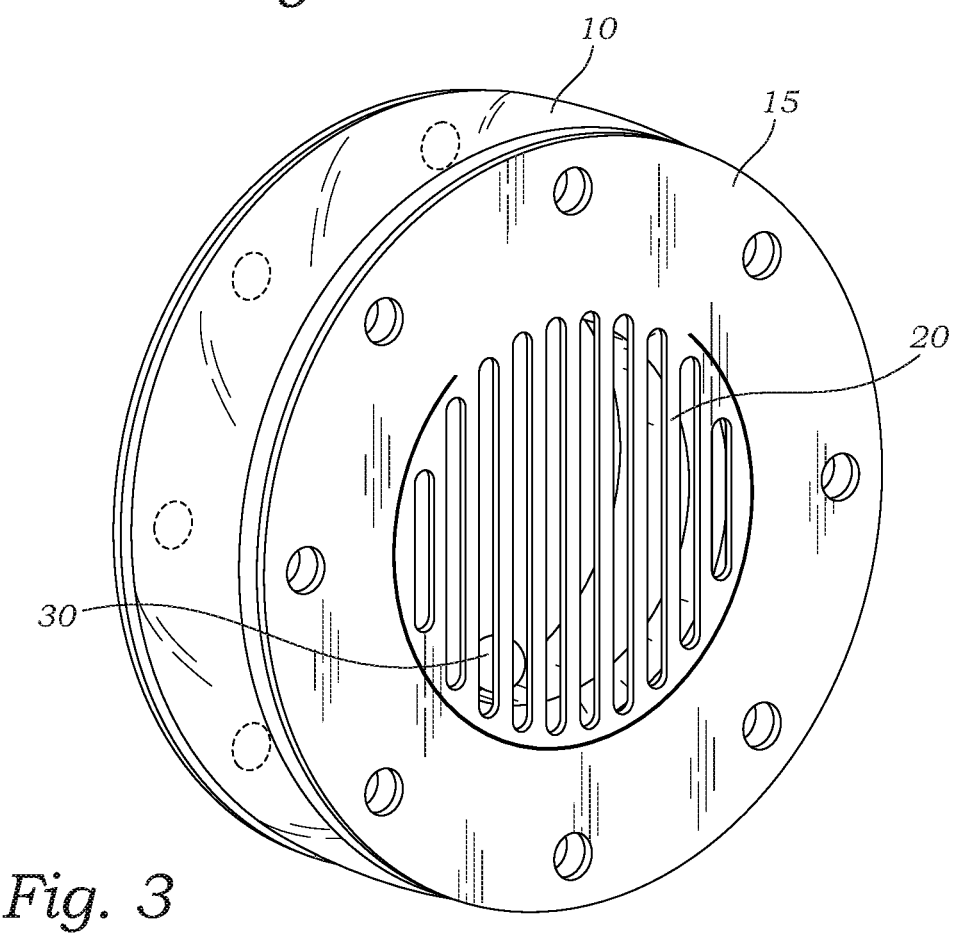
FIG. 3 is a perspective view of one embodiment of the invention.
Figure 4:
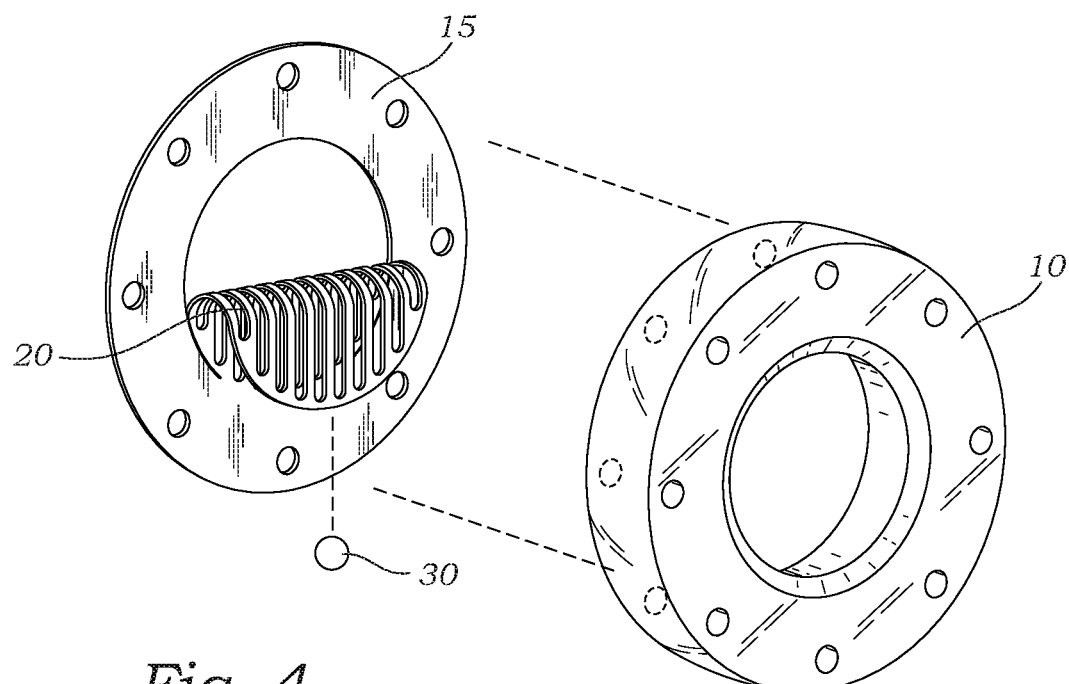
FIG. 4 is an exploded view of one embodiment of the invention showing the sight glass, a flange and one or more indicator objects contained in said sight glass and wherein said flange is bent like a taco to create a cage for containing said indicator object; wherein FIGS. 11-14 also show said flange being bent like a taco to create a cage, however, this view shows the cage in a different orientation when compared to FIG. 4.
Figure 5:
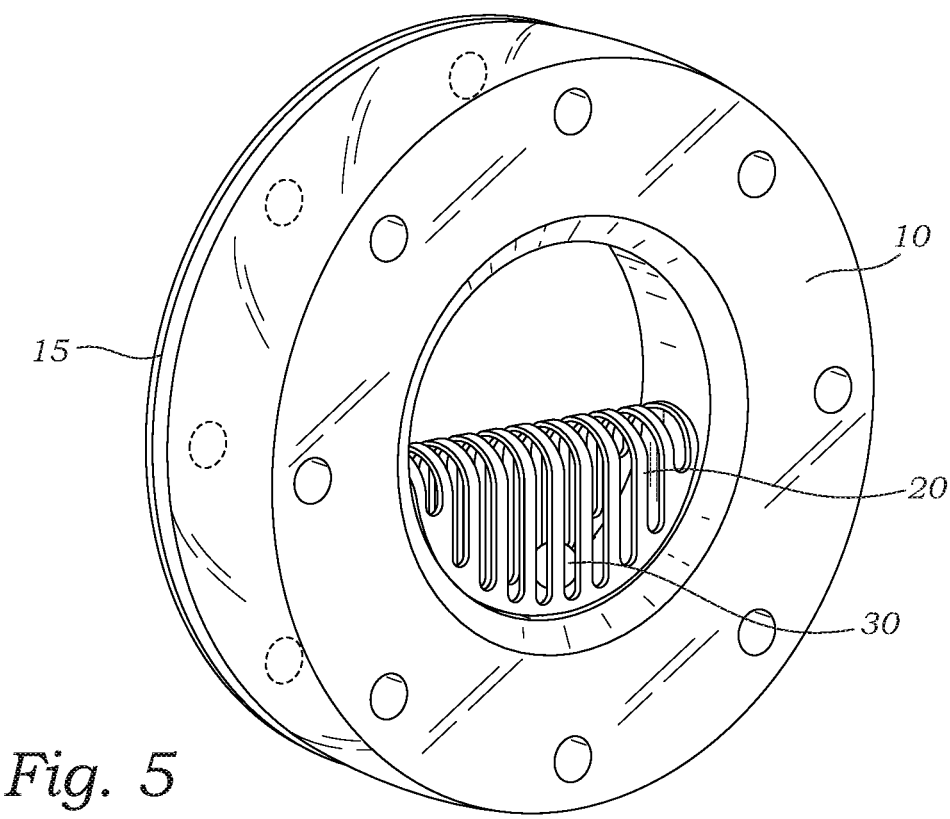
FIG. 5 is a perspective view of the invention.

FIGS. 2 and 3 are views of an alternative embodiment of the invention showing the sight glass 10, flanges 15 and one or more indicator objects 30 contained in said sight glass 10 between the first flange and a second flange to create a cage 20 for containing said indicator object 30. A spacer (not shown) can be inserted into an alternative embodiment between the sight glass 10 and the flange 15 on each side of said sight glass 10, if desired.

FIGS. 4, 5, and 19-22 are views of the preferred embodiment of the invention showing the sight glass 10, a flange 15 and one or more indicator objects 30 contained in said sight glass 10 and wherein said flange 15 is bent like a taco to create a cage 20 for containing said indicator object 30.

Figure 6:
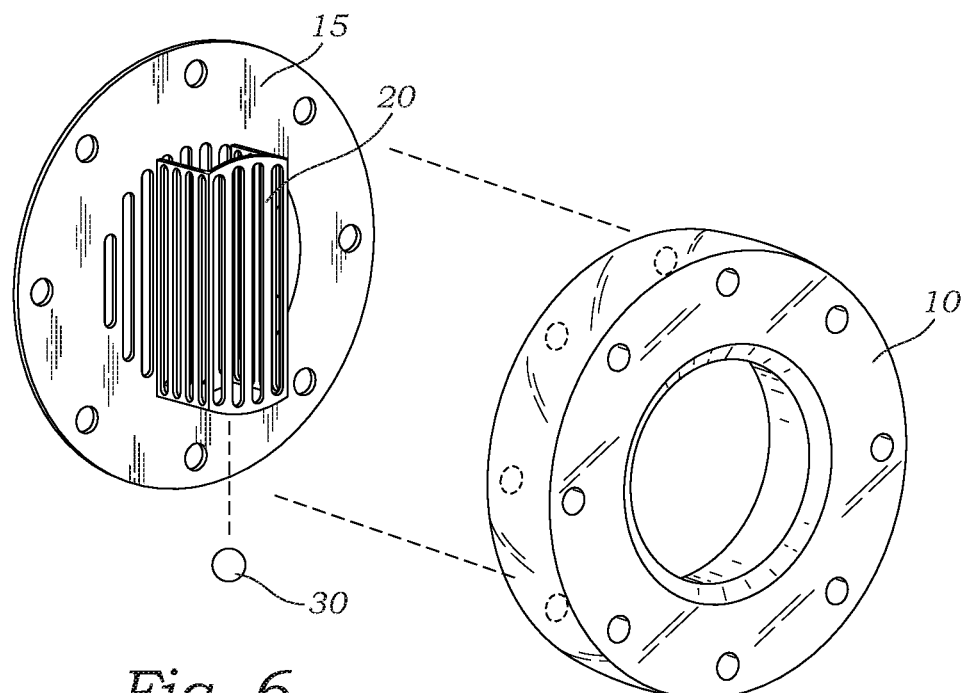
FIG. 6 is an exploded view of another embodiment of the invention showing a sight glass, a flange have a cage and one or more indicator objects contained in said sight glass and in said flange that has created a cage for containing said indicator object.
Figure 7:
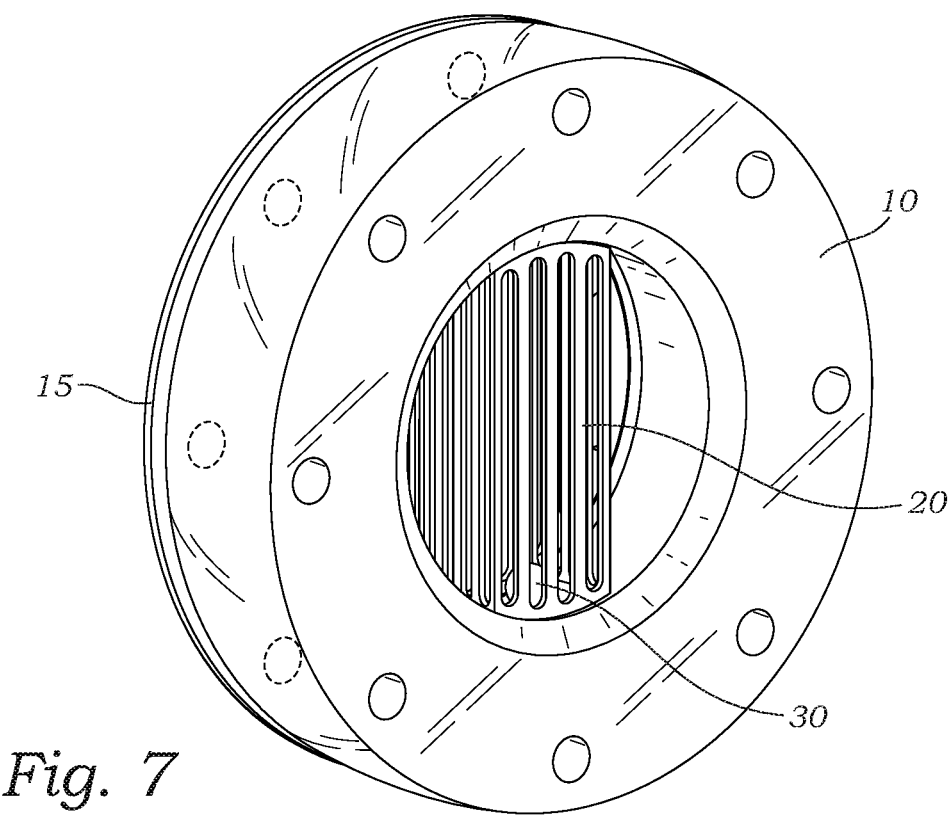
FIG. 7 is a perspective view of the invention.

FIGS. 6 and 7 are views of another embodiment of the invention showing a sight glass 10, a flange 15 have a cage 20 and one or more indicator objects 30 contained in said sight glass 10 and in said flange 15 that has created a cage 20 for containing said indicator object 30.

Figure 8:
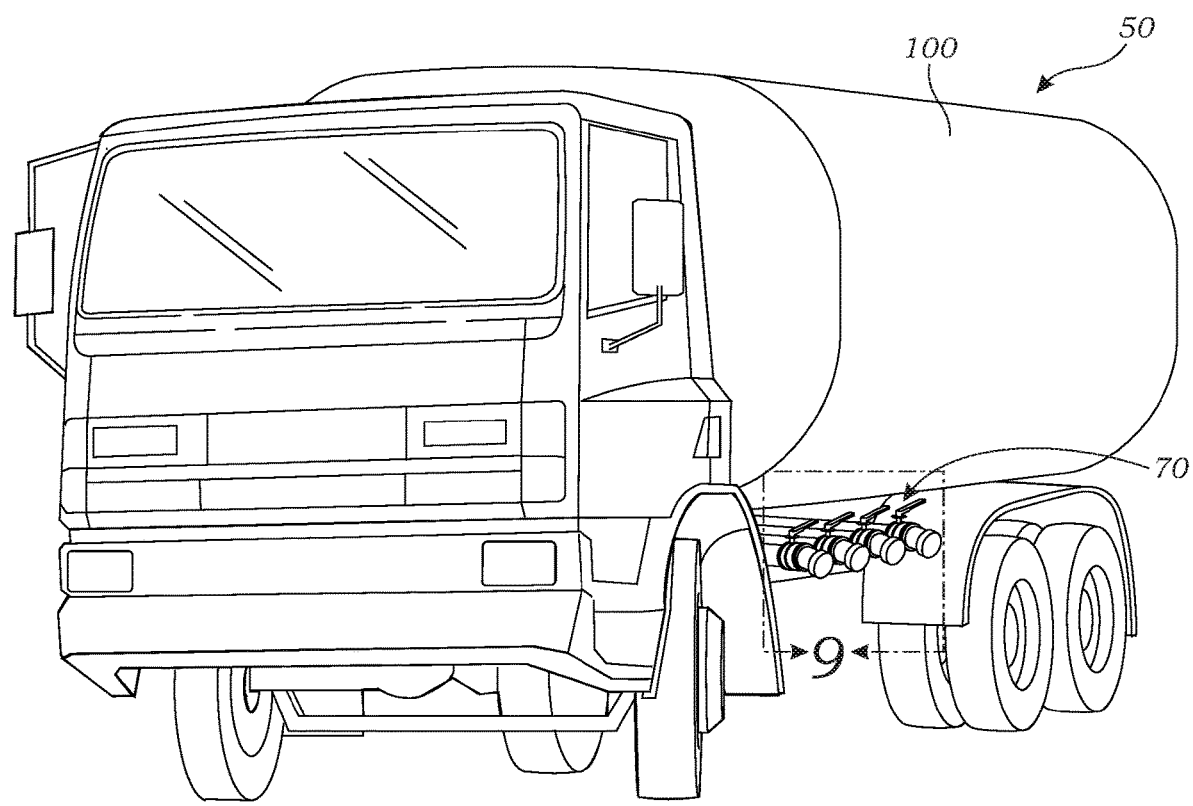
FIG. 8 is a perspective view of a tanker used to transport the liquid that flows through the housing of this invention.
Figure 9:
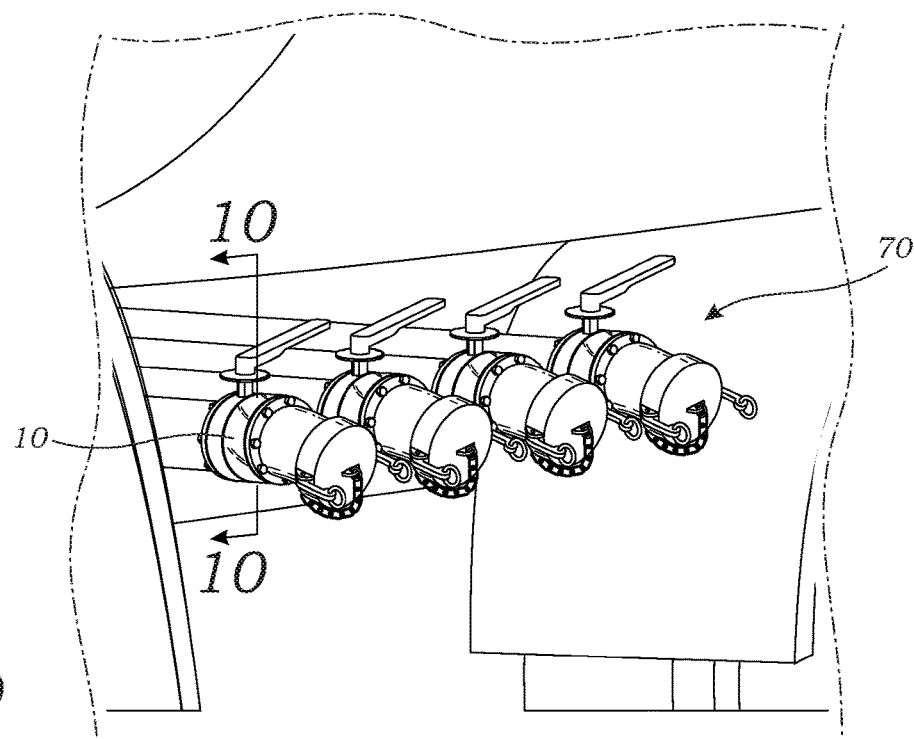
Figure 10:
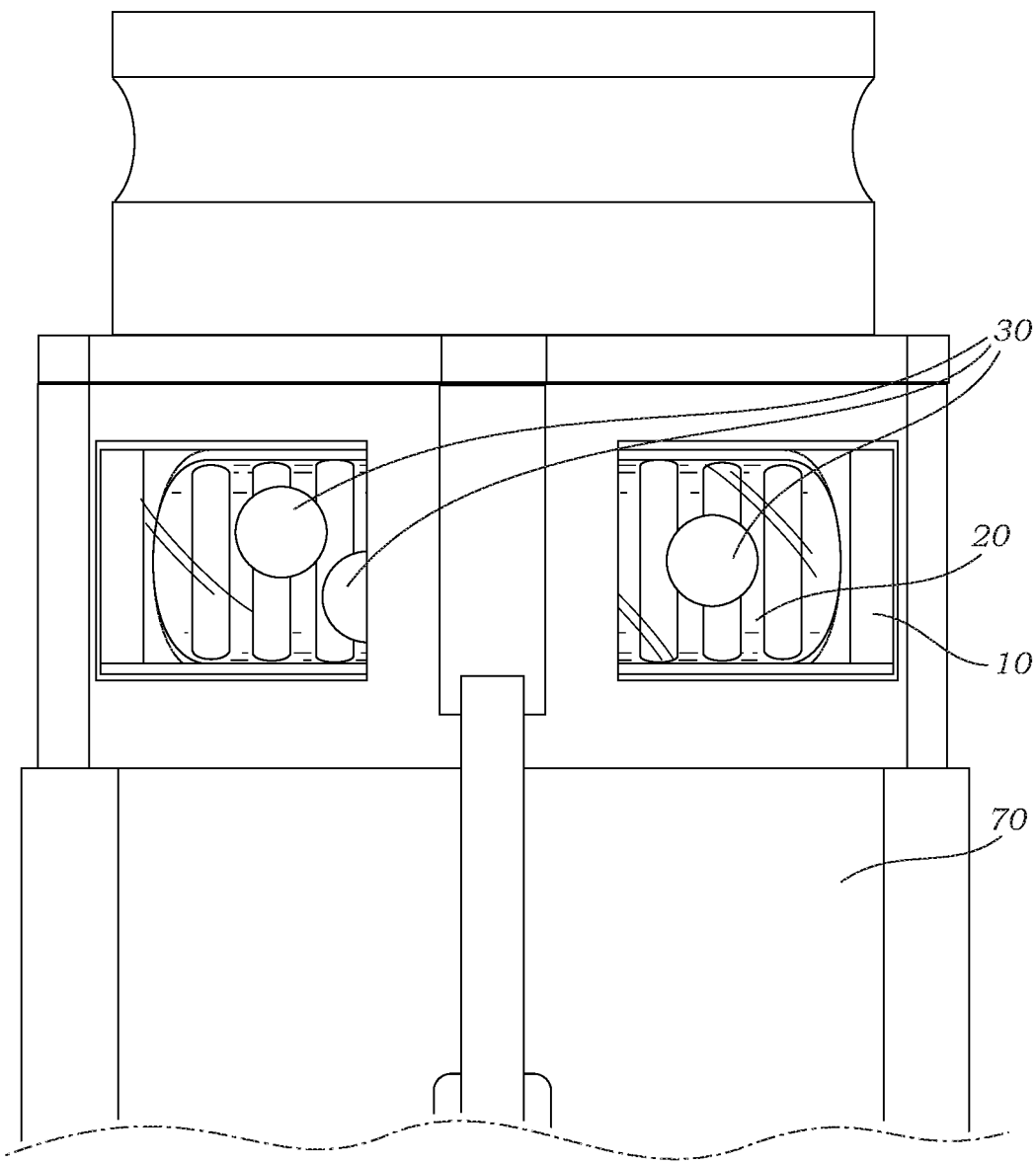
FIG. 10 is a close up view of the fuel connections for the tanker having a housing (flange sight view adapter) of this invention showing a sight glass within the body portion; one or more indicator objects contained within said house; and said housing has means for containing said indicator objects.
Figure 11:
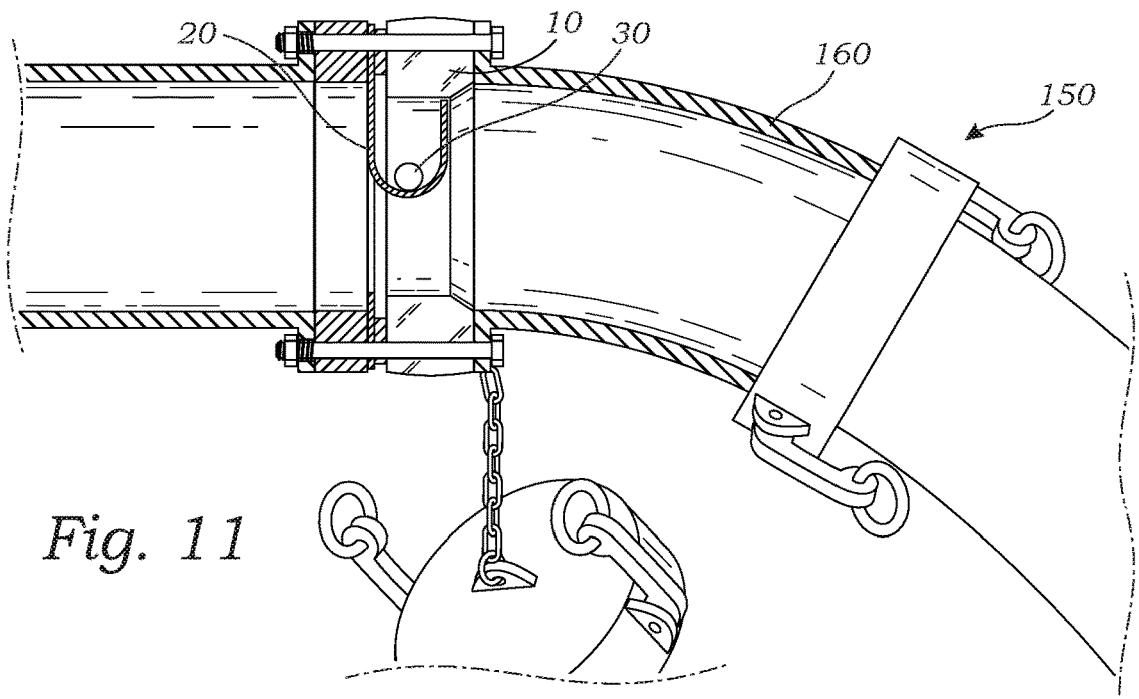
FIG. 11 is a perspective view of the preferred embodiment of the invention showing a housing (flange sight view adapter), a body portion defining an aperture configured for a fluid to flow through an interior of the body portion (a tube linear), wherein said housing has a sight glass, a flange and one or more indicator objects contained in said flange that has created a cage for containing said indicator object, and wherein said indicator objects can provide a visual indicator and/or an audio sound indicator as liquid move through said tube linear, thereby altering a user that liquid is flowing or has stop flowing.
Figure 28:
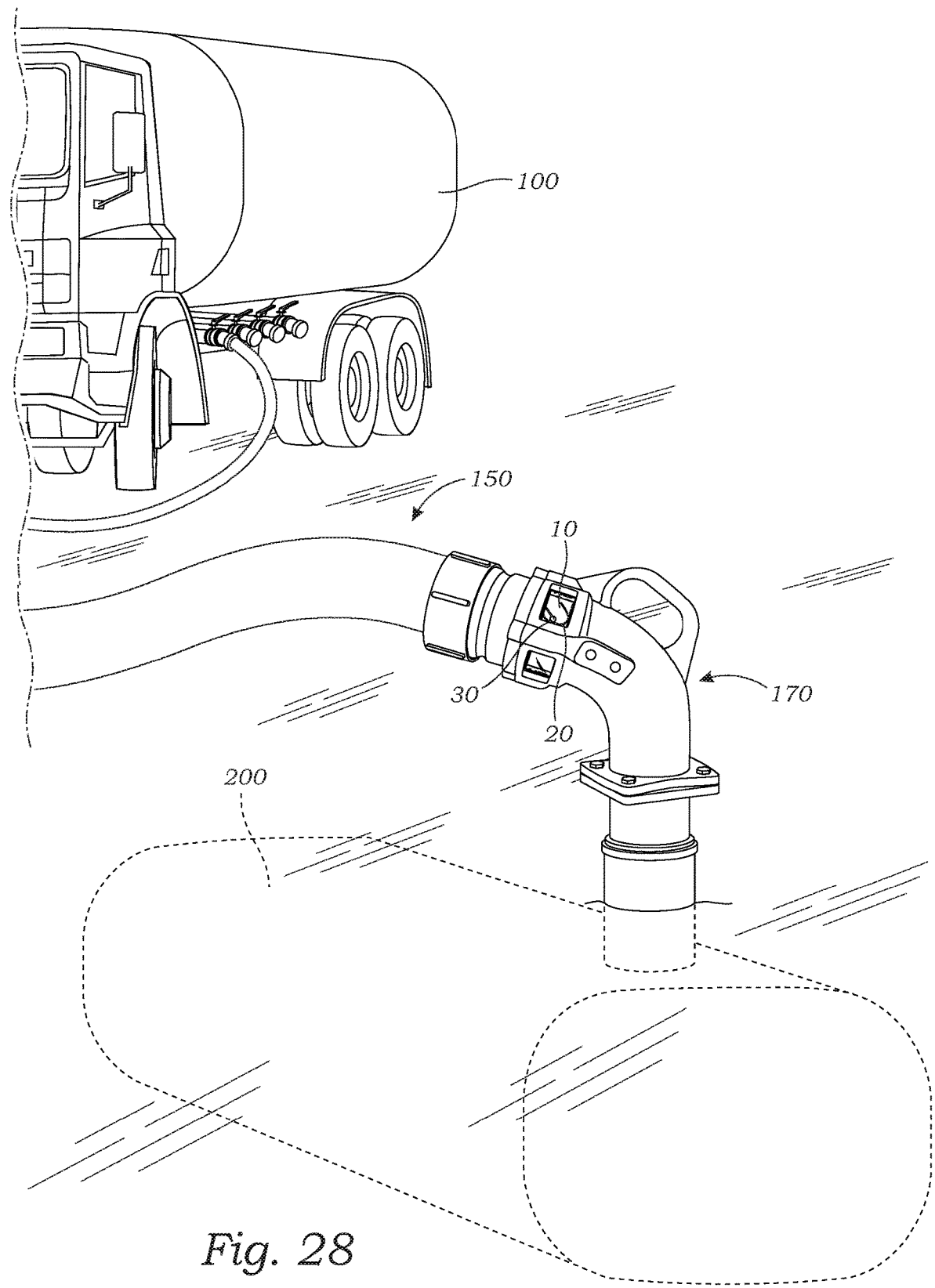
FIG. 28 is a perspective view of a tanker used to transport the liquid that flows through one or more housing(s) of this invention when fluid is transferred between a first fluid storage segment and a second fluid storage segment by using a body portion defining an aperture configured for a fluid to flow through an interior of the body portion; wherein one housing is positioned near the first fluid storage segment (i.e. tanker) and is shown in FIGS. 8-14; wherein another housing is positioned near the second fluid storage segment (i.e. ground storage) and is shown in FIGS. 23-24 and 28, showing a perspective view of a housing (fuel delivery adapter) modified with this invention to hold a sight glass, a flange, and one indicator objects contained within said flange and shown in the sight glass; wherein said indicator objects can provide a visual indicator and/or an audio sound indicator as liquid move through said tube linear, thereby altering a user that liquid is flowing or has stop flowing.

FIGS. 8, 9, and 28 are views of a tanker 50 used to transport the liquid that flows through a housing 70 or 170 of this invention, when fluid is transferred between a first fluid storage segment 100 (i.e. tanker) and a second fluid storage segment 200 (i.e. ground storage) by using said housing 70 and said body portion 160 defining an aperture configured for a fluid to flow through an interior of the body portion 160.

Figure 12:
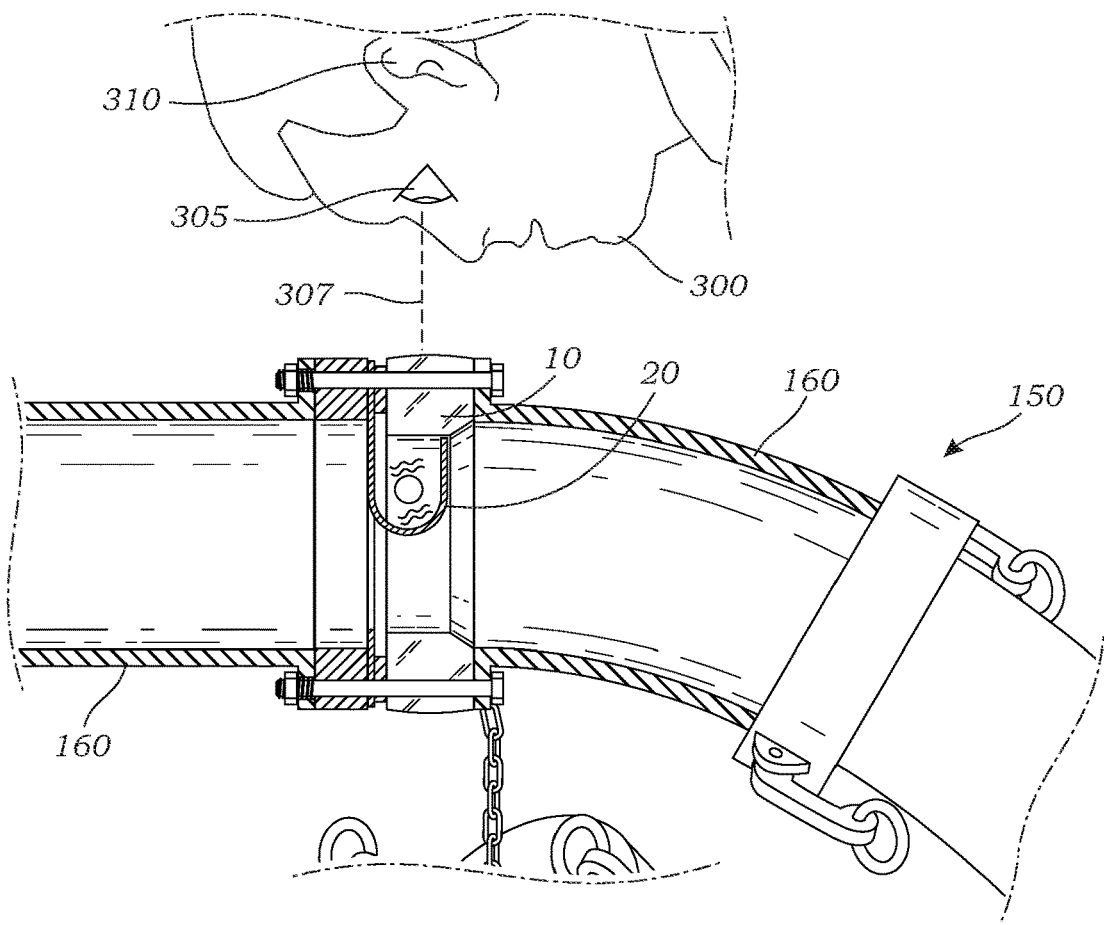
FIG. 12 is a perspective view of an alternative embodiment of the invention showing that a user is now able to perform a visual inspection using one or more eyes independently as to the fluid, whether liquid is flowing through a tube linear, a sight glass, a flange and one or more indicator objects contained in said sight glass and in said flange that has created a cage for containing said indicator object, and wherein said indicator objects provide said visual as liquid move through said tube linear, thereby altering a user that liquid is flowing or has stop flowing.
Figure 13:
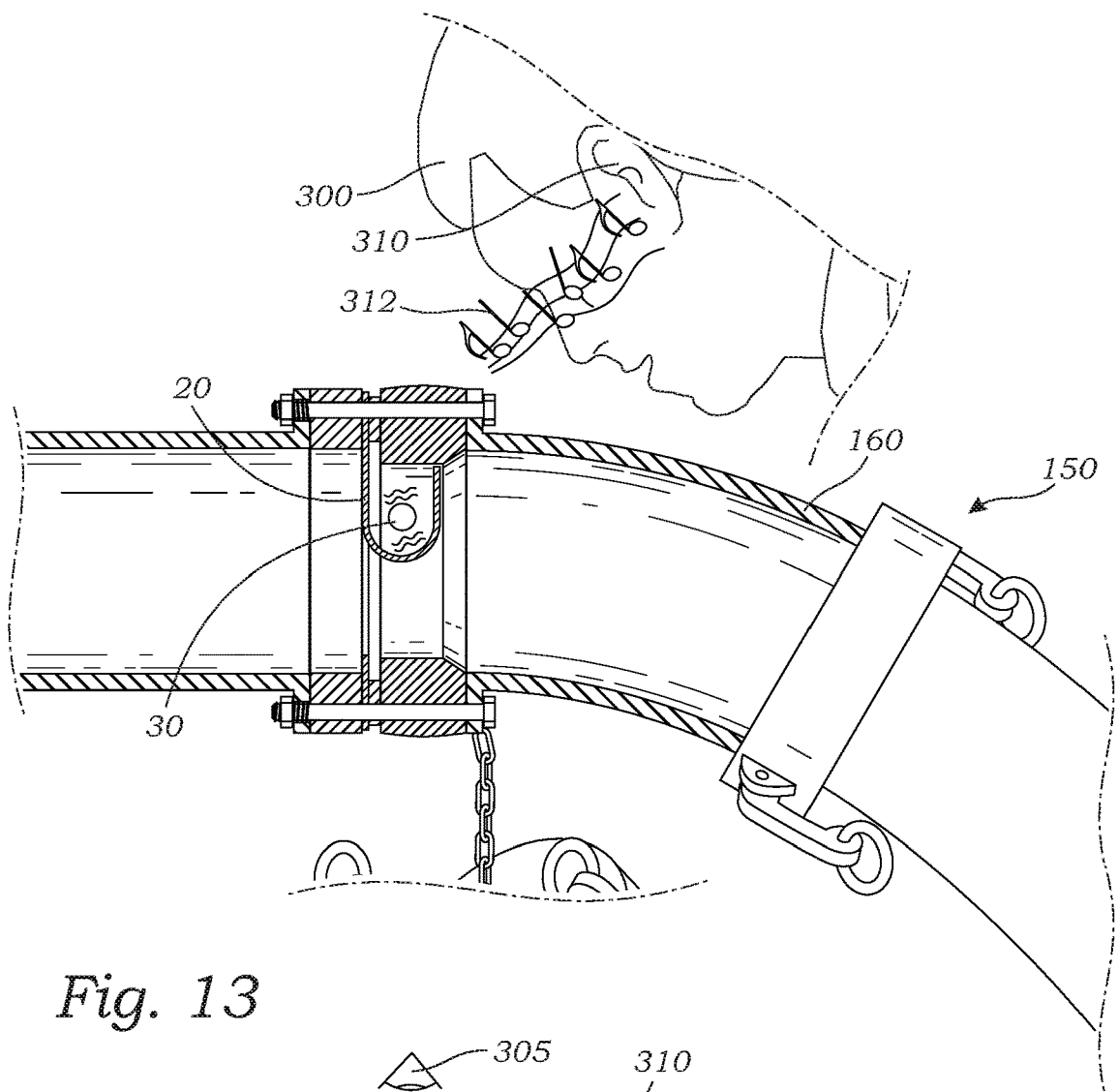
FIG. 13 is a perspective view of an alternative embodiment of the invention showing that a user is now able to perform an audio inspection independently as to the fluid, whether liquid is flowing through a tube linear, NO sight glass, a flange and one or more indicator objects contained in said tube linear and in said flange that has created a cage for containing said indicator object, and wherein said indicator objects provide said audio sound as liquid move through said tube linear, thereby altering a user that liquid is flowing or has stop flowing.
Figure 14:
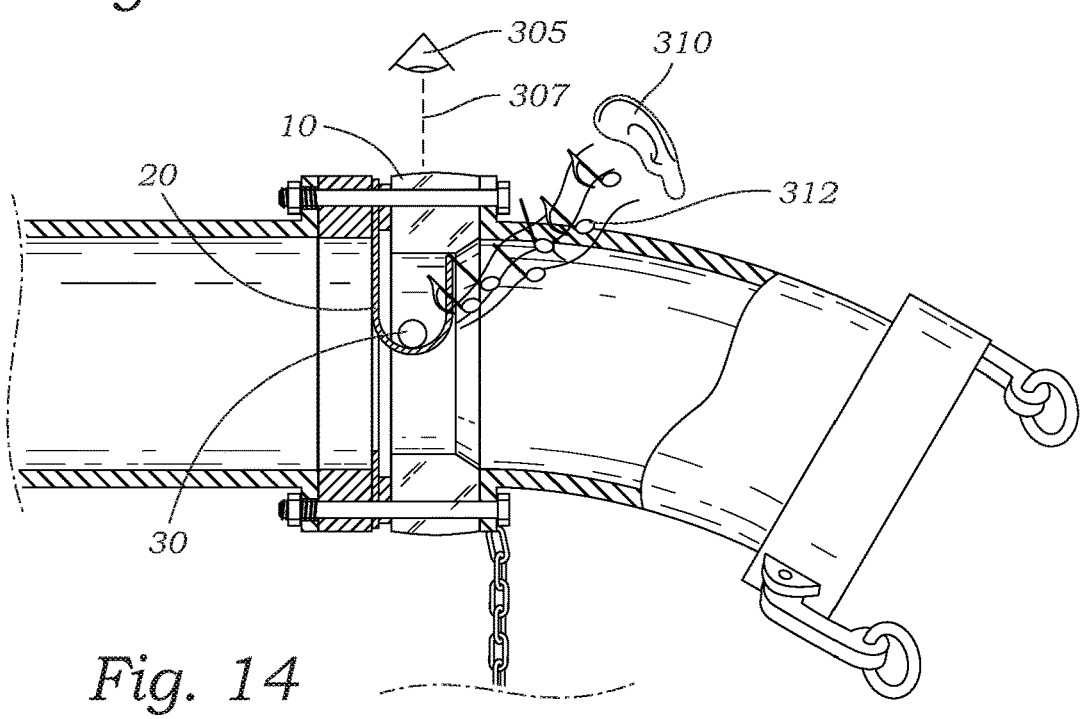
FIG. 14 is a perspective view of the preferred embodiment of the invention showing that a user is now able to perform a visual inspection using one or more eyes and also an audio inspection using one or more ears independently as to the fluid, whether liquid is flowing through a tube linear, a sight glass, a flange and one or more indicator objects contained in said sight glass and in said flange that has created a cage for containing said indicator object, and wherein said indicator objects provide said visual and said audio sound as liquid move through said tube linear, thereby altering a user that liquid is flowing or has stop flowing.

FIGS. 10-14 and FIGS. 25-27 is a view of the fuel connections for the tanker having a housing 70 (flange sight view adapter) of this invention, a body portion 160 defining an aperture configured for a fluid to flow through an interior of the body portion 160 of a tube linear, wherein said housing 70 has a sight glass 10, a cage 20 and one or more indicator objects 30 contained in said a cage 20 for containing said indicator object 30. Wherein FIG. 12 is a perspective view of an alternative embodiment of the invention showing that a user 300 using his eyes 305 is now able to perform a visual inspection 307. Wherein FIG. 13 is a perspective view of an alternative embodiment of the invention showing that a user 300 using his ears 310 is now able to perform an audio inspection 312. Wherein FIG. 14 is a perspective view of the preferred embodiment of the invention showing that a user is now able to perform a visual inspection 307 and also an audio inspection 312, whether liquid is flowing through a body portion 160 and a housing 70 having a sight glass 10, a flange and one or more indicator objects 30 contained in said sight glass 10 and in said flange that has created a cage 20 for containing said indicator object 30, and wherein said indicator objects 30 provide said visual and said audio sound as liquid move through said body portion of a tube linear, thereby altering a user 300 that liquid is flowing or has stop flowing.

Figure 15:
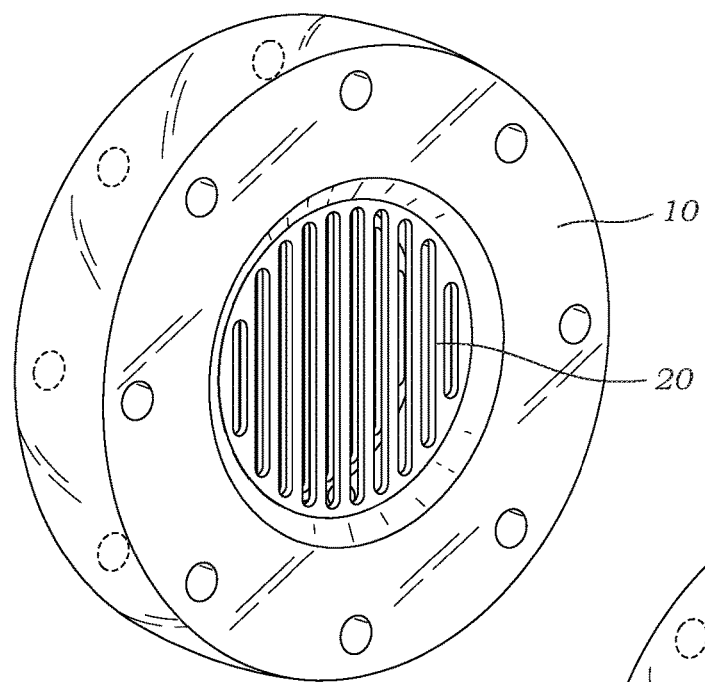
FIG. 15 is a front perspective view of an alternative embodiment of the invention showing the sight glass having a built in cage for containing one or more indicator objects, wherein said sight glass and cage are manufactured as one piece with one or more indicator objects inside.
Figure 16:
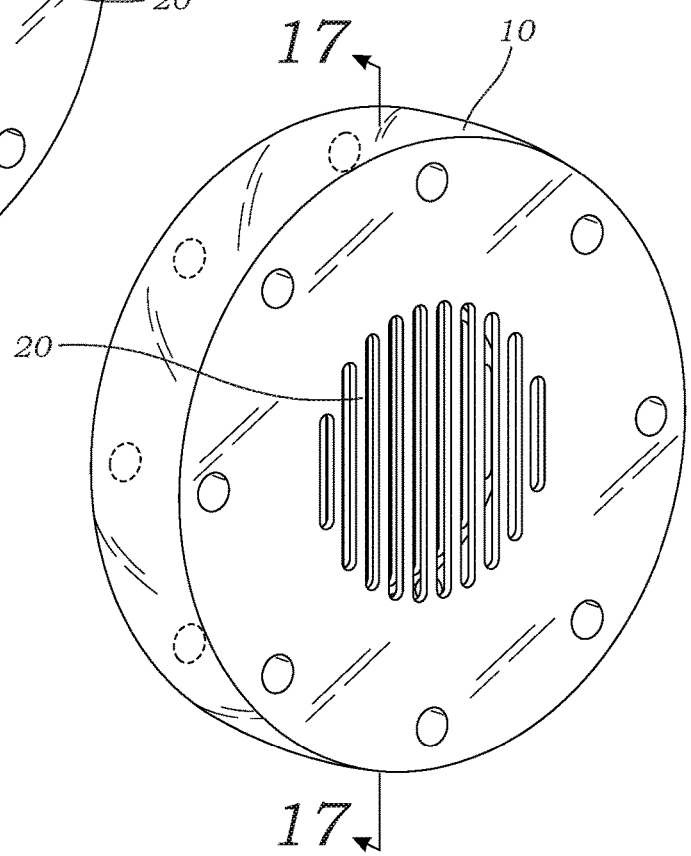
FIG. 16 is a back perspective view of the alternative embodiment of the invention showing the sight glass having a built in cage for containing one or more indicator objects.
Figure 17:
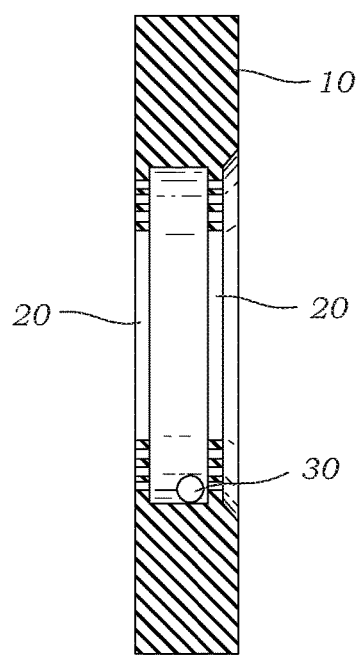
FIG. 17 is a side view showing an alternative embodiment showing the sight glass having a built in cage for containing one or more indicator objects.

FIG. 15-17 are views of an alternative embodiment of the invention showing the sight glass 10 having a built in cage 20 for containing one or more indicator objects 30, wherein said sight glass 10 and cage 20 are manufactured as one piece with one or more indicator objects 30 inside.

Figure 18:
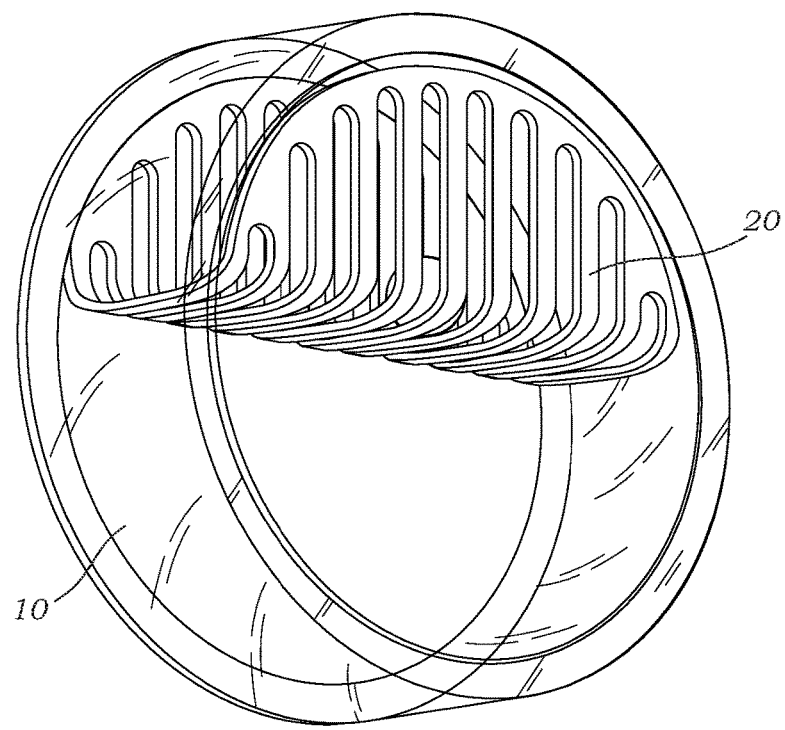
FIG. 18 is a perspective view of yet another alternative embodiment of the invention showing a sight glass having a cage that is bent to contain one or more indicator objects, wherein said sight glass and cage are manufactured as one piece with one or more indicator objects inside.
Figure 19:
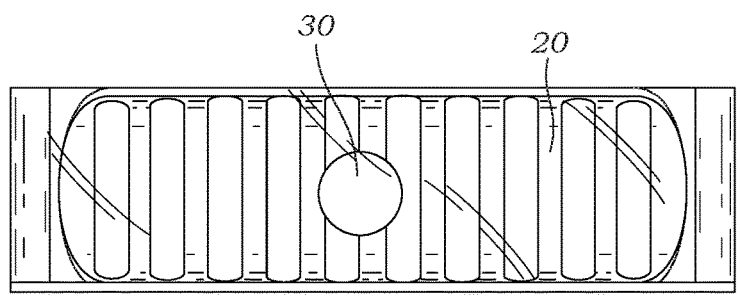
FIG. 19 is a top view of another alternative embodiment of the invention showing a sight glass, a flange, and one indicator objects contained within said flange.
Figure 20:
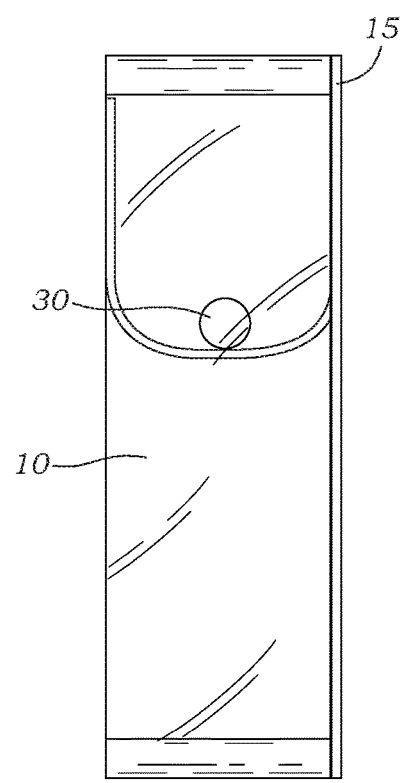
FIG. 20 is a side view of the alternative embodiment of the invention showing a sight glass, a flange, and one indicator objects contained within said flange.
Figure 21:
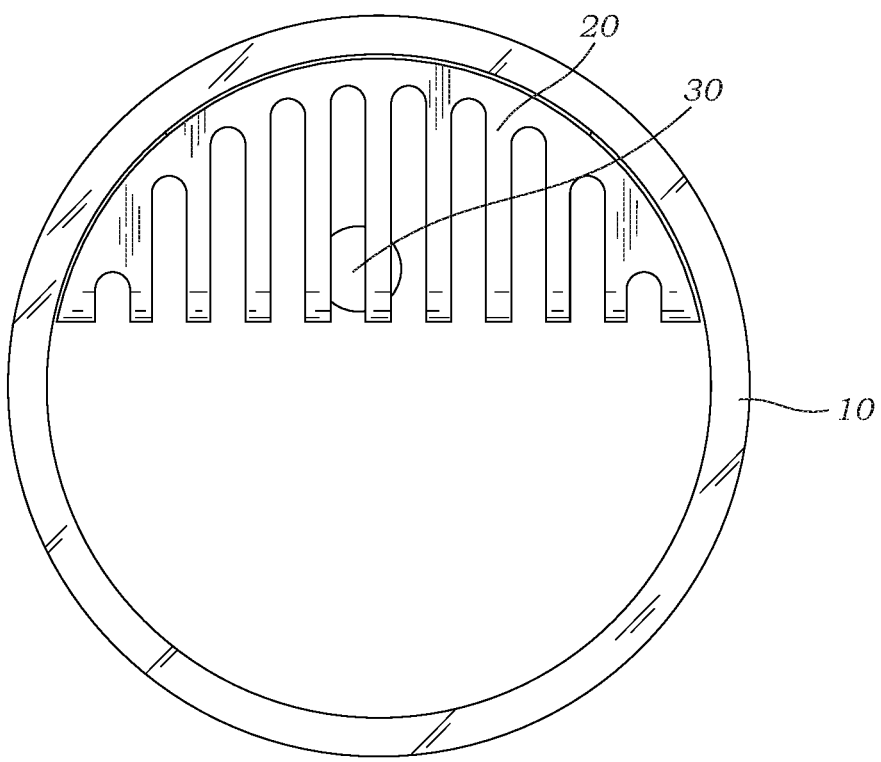
FIG. 21 is a front view of the alternative embodiment of the invention showing a sight glass, a flange, and one indicator objects contained within said flange.
Figure 22:
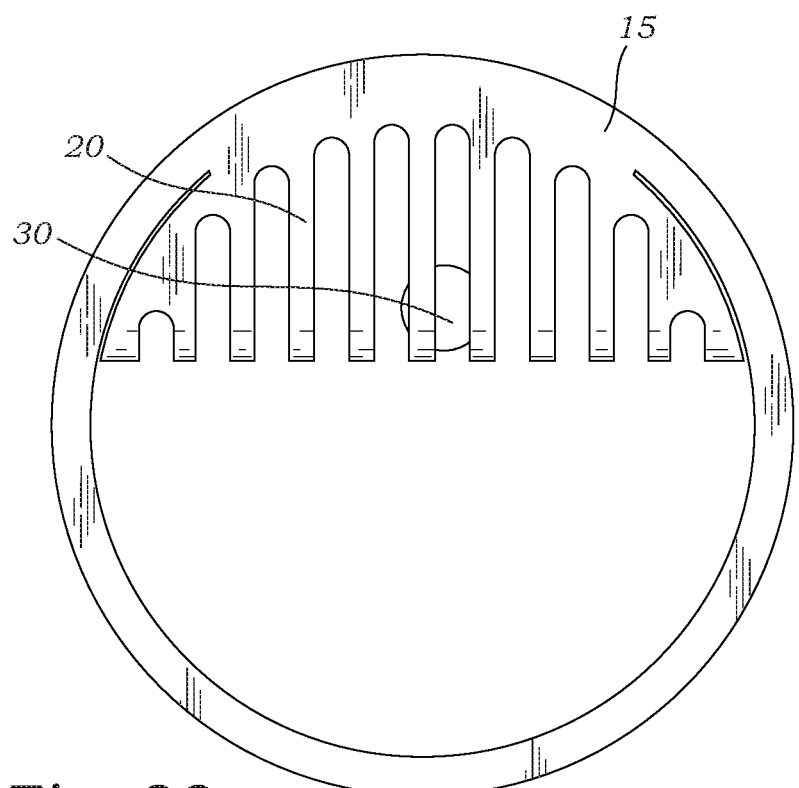
FIG. 22 is a back view of the alternative embodiment of the invention showing a sight glass, a flange, and one indicator objects contained within said flange.

FIG. 18 is a perspective view of yet another alternative embodiment of the invention showing a sight glass 10 having a cage 20 to contain one or more indicator objects 30, wherein said sight glass 10 and cage 20 are manufactured as one piece with one or more indicator objects 30 inside.

Figure 23:
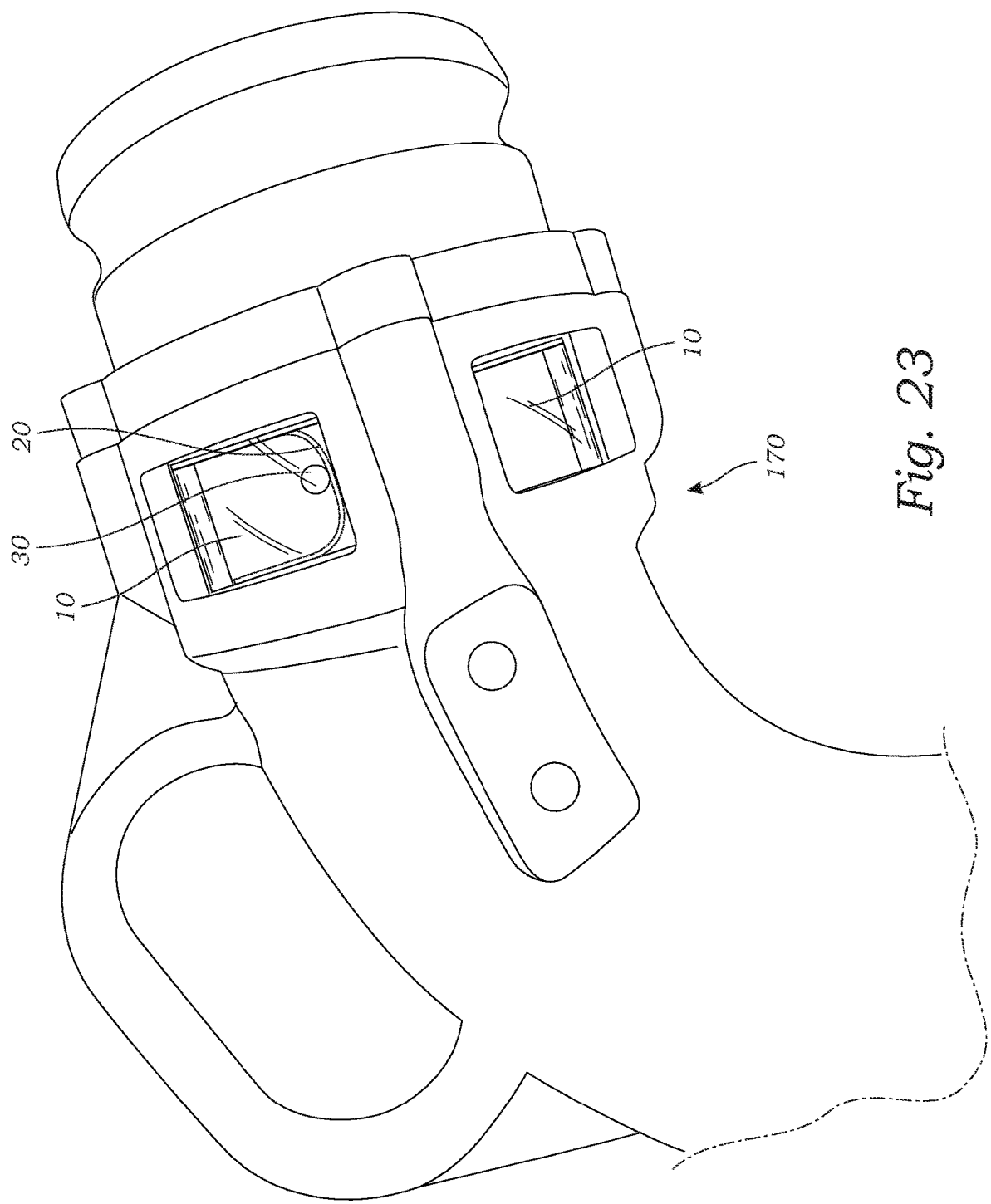
FIG. 23 is a side view of a housing (fuel delivery adapter) modified with this invention to hold a sight glass, a flange, and one indicator objects contained within said flange and shown in the sight glass.
Figure 24:
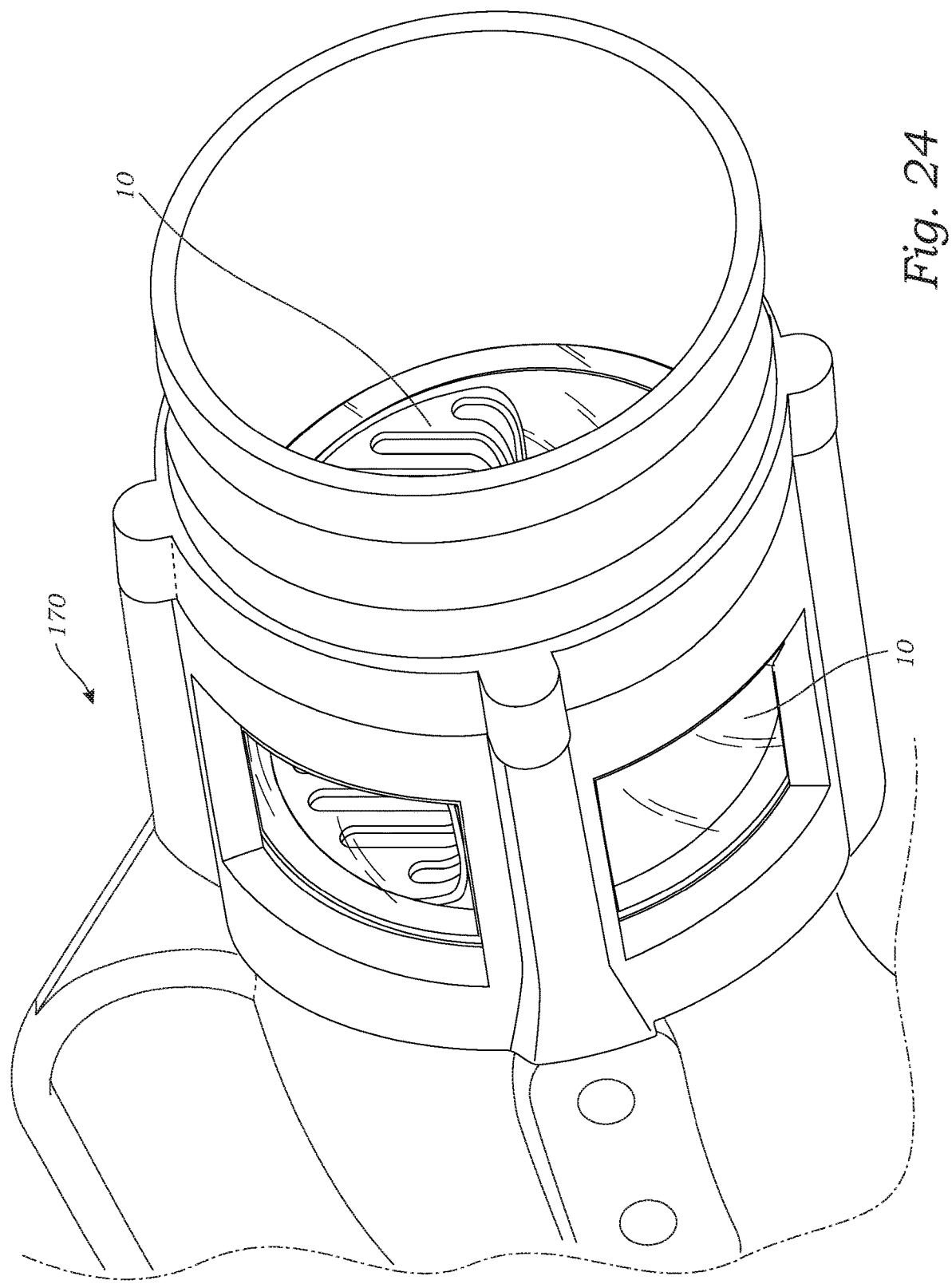
FIG. 24 is a perspective view of a housing (fuel delivery adapter) modified with this invention to hold a sight glass, a flange, and one indicator objects contained within said flange and shown in the sight glass.

FIGS. 23 and 24 are views of a housing 170 (fuel delivery adapter) modified with this invention to hold a sight glass 10, a cage 20, and one indicator objects 30 contained within said cage 20 and shown in the sight glass 10.

Figure 25:
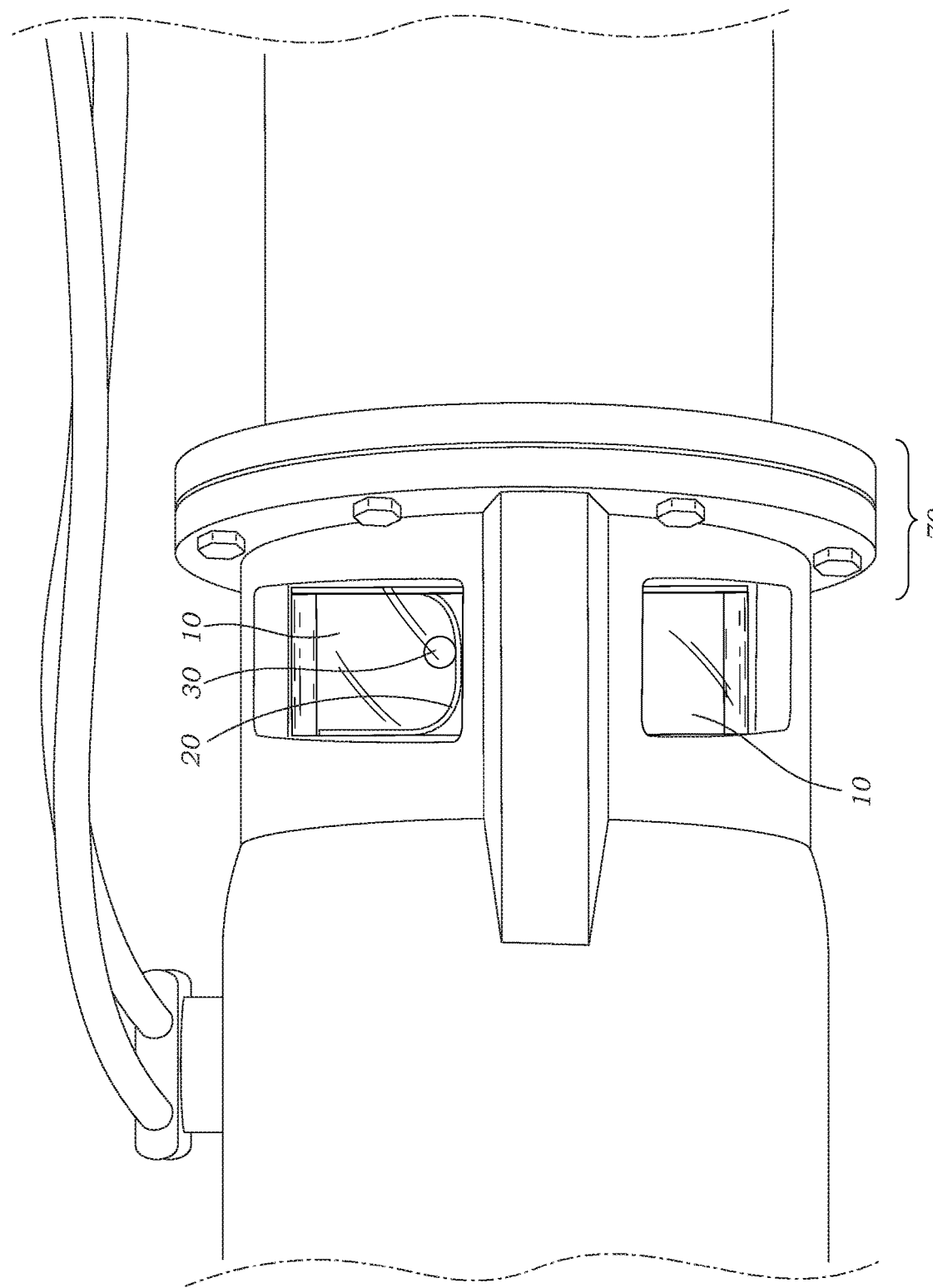
FIG. 25 is a perspective side view of a housing (flange sight view adapter) modified with this invention to hold a sight glass, a flange, and one indicator objects contained within said flange and shown in the sight glass.
Figure 26:
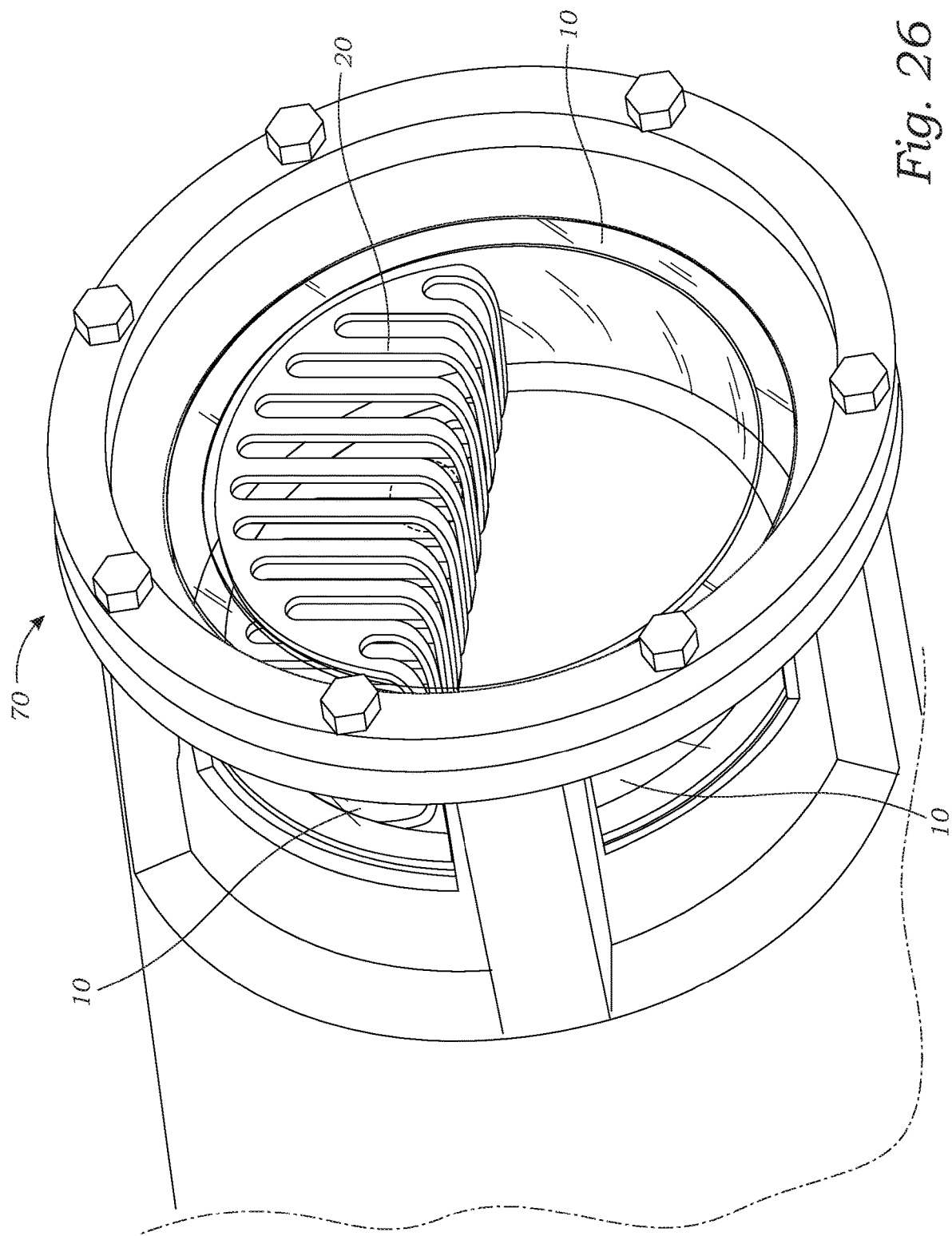
FIG. 26 is a perspective side view of a housing (flange sight view adapter) modified with this invention to hold a sight glass, a flange, and one indicator objects contained within said flange and shown in the sight glass.
Figure 27:
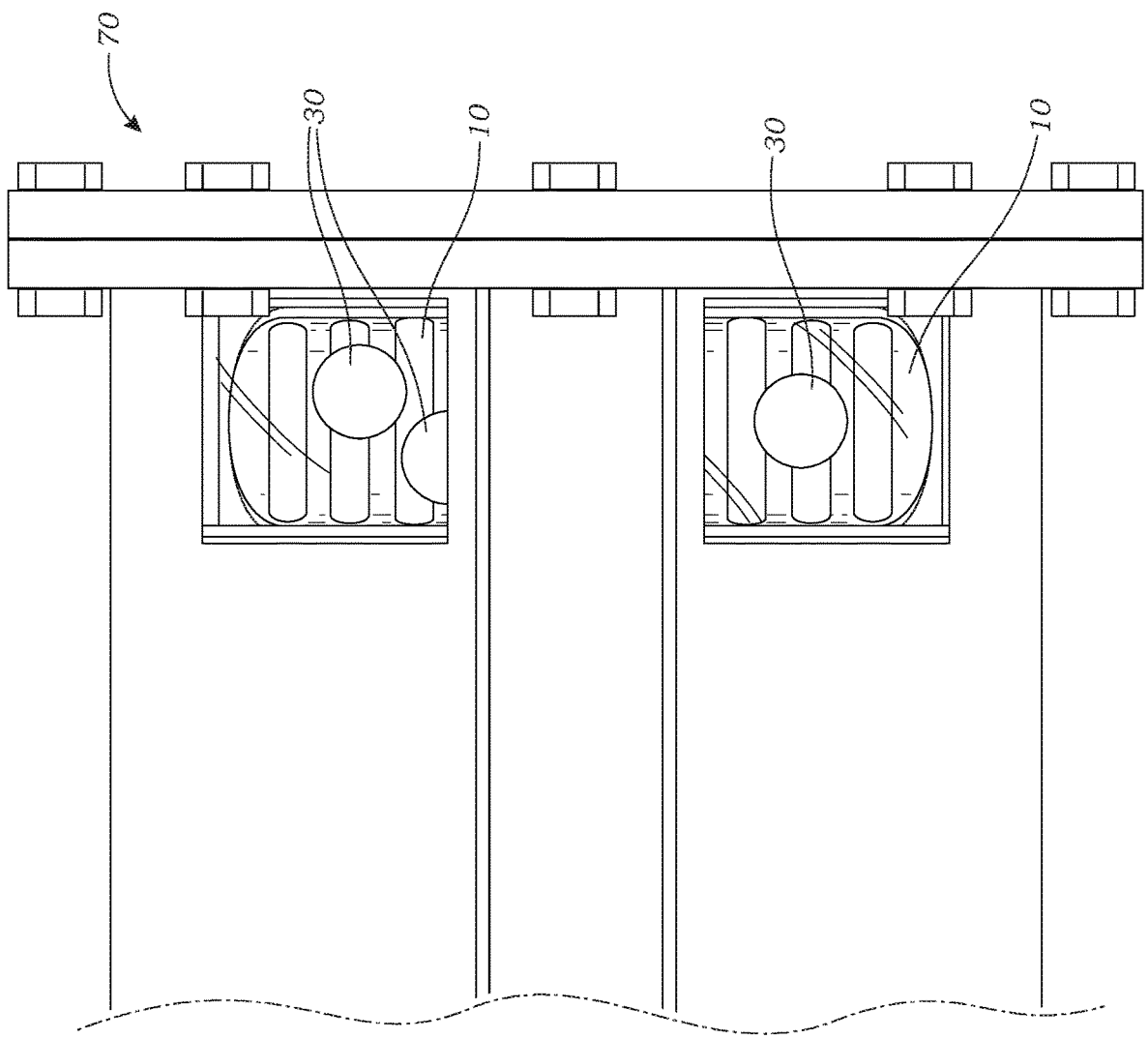
FIG. 27 is a side view of a housing (flange sight view adapter) modified with this invention to hold a sight glass, a flange, and one indicator objects contained within said flange and shown in the sight glass.

FIG. 25-27 are views of a housing 70 (flange sight view adapter) modified with this invention to hold a sight glass 10, a cage 20, and one indicator objects 30 contained within said cage 20 and shown in the sight glass 10.

FIG. 28 is a perspective view of a tanker 50 used to transport the liquid that flows through one or more housing(s) 70 and/or 170 of this invention when fluid is transferred between a first fluid storage segment 100 and a second fluid storage segment 200 by using a body portion 160 defining an aperture configured for a fluid to flow through an interior of the body portion 160; wherein one housing 70 is positioned near the first fluid storage segment 100 (i.e. tanker) and is shown in FIGS. 8-14; wherein another housing 170 is positioned near the second fluid storage segment 200 (i.e. ground storage) and is shown in FIGS. 23-24 and 28, showing a perspective view of a housing (fuel delivery adapter) modified with this invention to hold a sight glass 10, a cage 20, and one indicator objects 30 contained within said cage 20 or flange 15 and shown in the sight glass 10. Wherein said indicator objects 30 can provide a visual indicator 307 and/or an audio sound indicator 312 as liquid move through said body portion 160 of said tube linear, thereby altering a user 300 that liquid is flowing or has stop flowing.

A liquid flow indicator device comprising: a sight glass 10 having first end and a second end; said sight glass has an aperture configured for a fluid to flow through an interior of said sight glass; said sight glass 10 has one or more cages 20 positioned around said sight glass for containing one or more indicator objects 30, so a user 300 can see with his eyes 305 said indicator objects 30, which are visible by said user 300 looking through said sight glass, thereby providing visual notification 307 to said user; wherein when said liquid is flowing through said cages 20 and said sight glass 10, said indicator objects 30 will float around inside said cage 20, thereby providing visual notification 307 to said user 300 that said liquid is flowing through said cage 20 and said sight glass 10; and wherein when said liquid is not flowing through said cages 20 and said sight glass 10, said indicator objects will sit still inside said cage 20, thereby providing visual notification 307 to said user 300 that said liquid is not flowing through said cage 20 and said sight glass 10.

Wherein said indicator objects 30 makes a sound when said liquid flows through said sight glass 10 and through said cage 20 by banging around inside said cage 20, thereby providing audio notification 312 to said user 300 and his ears 310 that said liquid is flowing through said sight glass 10.

Wherein said cages 20 are built into said first end and said second end of said sight glass 10.

Wherein said cage 20 is created by bending a flange 15 that is positioned around said sight glass 10 to provide visual notification 307 to said user 300 looking through said sight glass 10.

Wherein said cage 20 is created by positioning a first flange around said first end of said sight glass 10 and a second flange around said second end of said sight glass 10, said first flange and said second flange each have a cages wall for containing said indicator objects 30, when said liquid flows through said sight glass 10.

Wherein said cages are positioned inside said sight glass.

Wherein said cage 20 is created by bending a flange 15 that is positioned inside said sight glass 10 to provide visual notification 307 to said user 300 looking through said sight glass 10.

Wherein said cage 20 is attached to a flange 15, which is positioned inside said sight glass 10 to provide visual notification 307 to said user 300 looking through said sight glass 10.

Wherein said indicator objects 30 is chosen from a group consisting of steel, aluminum, aluminum alloys, titanium, plastic, rubber, carbon fiber, composite materials, or some combination thereof.

Wherein said indicator objects 30 is chosen from a group consisting of Spheres, Cubes, Cuboids, Ellipsoids, Cylinders, Cones, Triangular Prisms, Hexagonal Prisms, Triangular-based pyramids, Square based pyramids, Hexagonal Pyramids, Tetrahedrons, Octahedrons, Dodecahedrons, Cosahedron or some combination thereof.

Wherein said indicator objects 30 are of different sizes, different shapes, different colors, and different designs.

Wherein said indicator objects 30 are manufactured from different materials. Wherein said indicator objects 30 will provide both visual notifications 307 and/or audible notifications 312 to said user 300.

A fluid transport system, comprising: a first container 100; a second container 200; a coupler 150 coupled between the first container and the second container, the coupler including a body portion 160, the body portion defining an aperture configured for a fluid to flow through an interior of the body portion; a housing 70 having an opening therein sized to receive a sight glass 10; said sight glass 10 has an aperture configured for the fluid to flow through an interior of said sight glass 10; one or more indicator objects 30 contained within said housing 70; and said housing 70 has means for containing said indicator objects 30; said housing 70 is attached to said coupler 150; wherein the fluid transport system is configured to permit fluid flow from the first container 100 through the coupler 150 to the second container 200; wherein said fluid flows through said means for containing said indicator objects 30 in said housing 70 of said body portion 160 of said coupler 150, said indicator objects 30 will bounce around, thereby providing audible notification 307 to a user 300 that said fluid is flowing from said first container 100 through said sight glass 100 sealed in the body portion 160 of said coupler 150 to said second container 200; and wherein said indicator objects 30 are positioned in said sight glass 10 and when said fluid flows through said means for containing said indicator objects 30 in said housing 70 of said coupler 150, thereby providing visual notification 307 to said user 300 that said fluid is flowing from said first container 100 through said sight glass 10 sealed in the body portion 160 of said coupler 150 to said second container 200 as shown in FIG. 12.

Wherein said housing contained in said coupler. As shown in FIGS. 23, 24, and 28, said housing 170 is a fuel delivery adapter modified with this invention to hold a sight glass 10, a cage 20, and one indicator objects 30 contained within said cage 20 and shown in the sight glass 10. As shown in FIGS. 8-14 and 25-28, said housing 70 is flange sight view adapter modified with this invention to hold a sight glass 10, a cage 20, and one indicator objects 30 contained within said cage 20 and shown in the sight glass 10.

Wherein said indicator objects 30 will provide both visual and/or audible notifications to said user 300. Wherein said means for containing said indicator objects 30 is two or more cage walls 20 that are attached to said sight glass 10. Wherein said means for containing said indicator objects 30 is two or more cage walls 20 that are built into said sight glass 10 see FIGS. 15-17. Wherein said means for containing said indicator objects 30 is one or more cage walls 20 that are attached to one or more flanges 15 in said body portion to create one or more cages 20. Wherein said means for containing said indicator objects 30 is a cage 20 that is built into said body portion 160. Wherein said means for containing said indicator objects 30 is a first flange and a second flange each having a cage wall 20, which are positioned adjacent to said flanges 15 to create a cage 20, and said flanges 15 are connected to said body portion 160. Wherein said indicator objects 30 will provide both visual notifications 307 and audible notifications 312 to said user 300.

A liquid flow indicator assembly, comprising: a body portion 160 configured to couple between a first fluid transport segment 100 and a second fluid transport segment 200, the body portion 160 defining an aperture configured for a fluid to flow through an interior of the body portion 150; a housing 70 having an opening therein sized to receive a sight glass 10 within the body portion 160; one or more indicator objects 30 contained within said house 70; and said housing has means for containing said indicator objects 30; and wherein the fluid is configured to permit fluid flow from the first fluid transport segment 100 to the second fluid transport segment 200; wherein said fluid flows through said means for containing said indicator objects 30 in said housing 70 of said body portion 150, said indicator objects 30 will bounce around, thereby providing audible notification 312 to a user 300 that said fluid is flowing from said the first fluid transport segment 100 through said sight glass 10 sealed in the body portion 160 to the second fluid transport segment 200; and wherein said indicator objects 30 are positioned in said sight glass 10 and when said fluid flows through said means for containing said indicator objects 30 in said housing 70 of said body portion 150, thereby providing visual notification 307 to said user 300 that said fluid is flowing from the first fluid transport segment 100 through said sight glass 10 sealed in the body portion 160 to the second fluid transport segment 200.

Wherein said means for containing said indicator objects 30 are positioned around said sight glass 10. Wherein said means for containing said indicator objects 30 is two or more cage walls 20 that are attached to said sight glass 10. Wherein said means for containing said indicator objects 30 is two or more cage walls 20 that are built into said sight glass 10. Wherein said means for containing said indicator objects 30 is one or more cage walls 20 that are attached to one or more flanges 15 in said body portion to create one or more cages. Wherein said means for containing said indicator objects 30 is a flange 15, which is bent to create a cage 20, and said flange 15 is connected to said body portion 150. Wherein said means for containing said indicator objects 30 is a first flange and a second flange each having a cage wall 20, which are positioned adjacent said sight glass 10 so said flanges 15 will create a cage 20 around said sight glass 10, and said flanges 15 are connected to said body portion 160. Wherein said indicator objects 30 will provide both visual notifications 307 and/or audible notifications 312 to said user 300.

A method for monitoring liquid flow in a body portion configured to couple between a first fluid container and a second fluid container, said method comprising: providing a first fluid container 100, a second fluid container 200, a coupler 150 coupled between the first container and the second container, the coupler including: a body portion 160, the body portion 160 defining an aperture configured for fluid flow through an interior of the body portion, a housing 170 having an opening therein sized to receive a sight glass 10 within the body portion of the coupler 150, one or more indicator objects 30 contained around said sight glass 10, and said sight glass 10 has means for containing said indicator objects 30; wherein the fluid transport system is configured to permit fluid flow from the first fluid container 100 through the coupler 150 to the second fluid container 200; and wherein said indicator objects 30 make a noise, when said fluid flows through said means for containing said indicator objects 30, thereby providing audio notification 312 to a user 300 that said fluid is flowing from said first container 100 through said housing 170 sealed within the body portion 160 of said coupler 150 to said second container 200.

Wherein said means for containing said indicator objects 30 are positioned inside said sight glass 10, so a user 300 can see said indicator objects 30, which are visible by said user 300 looking through said sight glass 10, thereby providing visual notification 307 to said user 300. Wherein said indicator objects 300 will provide both visual notifications 307 and audible notifications 312 to said user 300. Wherein said means for containing said indicator objects 30 are positioned around said sight glass 10. Wherein said means for containing said indicator objects is two or more cage walls 20 that are attached to said sight glass 10. Wherein said means for containing said indicator objects 10 is two or more cage walls 20 that are built into said sight glass 10. Wherein said means for containing said indicator objects 30 is one or more cage walls 20 that are attached to one or more flanges 15 in said body portion to create one or more cages 20. Wherein said means for containing said indicator objects 30 is a flange 15, which is bent to create a cage 20, and said flange 15 is connected to said body portion 160. Wherein said means for containing said indicator objects 30 is a first flange and a second flange each having a cage wall 20, which are positioned adjacent said sight glass 10 so said flanges 15 will create a cage 20 around said sight glass 10, and said flanges 15 are connected to said body portion 160.

A liquid flow indicator device comprising: a flange 15; one or more indicator objects 30; said flange 15 has means for containing one or more indicator objects 30; and said flange 15 is connected to a body portion 160 having an aperture configured for a fluid to flow through an interior of the body portion; and said indicator objects 30 make a noise, when said liquid flows through said body portion 160 and said means for containing said indicator objects 30, thereby providing audio notification 312 to a user 300 that said liquid is flowing through said flange 15 and said body portion 160 as shown in FIG. 13.

Further comprising: a sight glass 10; and said flange 15 is positioned inside said sight glass 10, so said user 30 can see said indicator objects, which are visible by said user looking through said sight glass 10 contained by said flange 15 having means for holding said indicator objects 30 as shown in FIG. 14.

Wherein said flange 15 has two or more cage walls 20 that are attached to said flange 15 for containing one or more indicator objects 30. Wherein said flange 15 has two or more cage walls 20 that are built into said flange 15 for containing one or more indicator objects 30. Wherein said flange 15 has one or more cage walls 20 that are attached to one or more flanges 15 to create one or more cages 20 for containing one or more indicator objects 30. Wherein said flange 15 has a cage 20 for containing one or more indicator objects 30. Wherein said means for containing said indicator objects 30 is a first flange and a second flange each having a cage wall 20, which are positioned adjacent to said flanges 15 to create a cage 20, and said flanges 15 are connected to said body portion 160.

Further comprising: a sight glass 10; said cage 20 of said flange 10 is positioned around said sight glass 10, so said user can see said indicator objects 30, which are visible by said user 300 looking through said sight glass 10 contained in said cage 20 of said flange 15.

A fluid transport system, comprising: a first container 100; a second container 200; a coupler 150 coupled between the first container 100 and the second container 200, the coupler 150 including: a body portion 160, the body portion 160 defining an aperture configured for fluid flow through an interior of the body portion; a flange 15 and one or more indicator objects 30 sealed within the body portion 160 of said coupler 150, said flange 15 has means for containing said indicator objects 30; wherein the fluid transport system is configured to permit fluid flow from the first container 100 through the coupler 150 to the second container 200; and wherein said indicator objects 30 make a noise, when said fluid flows through said means for containing said indicator objects 30, thereby providing notice to a user 300 that said fluid is flowing from said first container 100 through said flange 15 sealed within the body portion 160 of said coupler 150 to said second container 200.

Further comprising: a sight glass 10; said sight glass 10 is attached to the body portion 160 of said coupler 150; and said flange 15 is positioned inside said sight glass 10, so said user 300 can see said indicator objects 30, which are visible by said user 300 looking through said sight glass 10 contained by said flange 15 having means for holding said indicator objects 30.

Wherein said indicator objects 30 will provide both visual notifications 307 and/or audible notifications 312 to said user 300.

Wherein said means for containing said indicator objects 30 is one or more cage walls 20 that are attached to one or more flanges 15 to create one or more cages 20.

Further comprising: a sight glass 10; and said cage 20 of said flange 15 is positioned inside said sight glass 10, so said user 300 can see said indicator objects 30, which are visible by said user 300 looking through said sight glass 10 contained in said cage 20 of said flange 15.

Wherein said flange 15 is a cage 20. Wherein said flange 15 has one or more cage walls 20 that are attached to said flange 15 for containing one or more indicator objects 30. Wherein said flange 15 has one or more cage walls 20 that are built into said flange 15 for containing one or more indicator objects 30. Wherein said means for containing said indicator objects 30 is a first flange and a second flange each having a cage wall 20, which are positioned adjacent to said flanges 15 to create a cage 20, and said flanges 15 are connected to said body portion 160.

Further comprising: a sight glass 10; and said cage 20 of said flange 15 is positioned inside said sight glass 10, so said user 300 can see said indicator objects 30, which are visible by said user 300 looking through said sight glass 10 contained in said cage 20 of said flange 15.

A liquid flow indicator assembly, comprising: a body portion 160 configured to couple between a first fluid transport segment 100 and a second fluid transport segment 200, the body portion 160 defining an aperture configured for fluid flow through an interior of the body portion; a housing 70 having an opening therein sized to receive a flange 15 within the body portion 160; one or more indicator objects 30 contained within said flange 15; said flange 15 has means for containing said indicator objects 30.

Further comprising: a sight glass 10; said sight glass 10 is attached to the body portion 160; said flange 15 is positioned inside said sight glass 10, so said user 300 can see said indicator objects 30 which are visible by said user 300 looking through said sight glass 10 contained by said flange 15 having means for holding said indicator objects 30.

Wherein said means for containing said indicator objects 30 is one or more cage walls 20 that are attached to one or more flanges 15 to create one or more cages 20.

Wherein said flange 15 has a cage 20. Wherein said flange 15 has one or more cage walls 20 that are attached to said flange 15 for containing one or more indicator objects 30. Wherein said flange 15 has one or more cage walls 20 that are built into said flange 15 for containing one or more indicator objects 30. Wherein said means for containing said indicator objects 30 is a first flange 15 and a second flange 15 each having a cage wall 20, which are positioned adjacent to said flanges 15 to create a cage 20, and said flanges 15 are connected to said body portion 160.

Further comprising: a sight glass 10; said cage 20 of said flange 15 is positioned inside said sight glass 10, so said user 300 can see said indicator objects 30, which are visible by said user 300 looking through said sight glass 10 contained in said cage 20 of said flange 15.

A method for monitoring liquid flow in a body portion configured to couple between a first fluid container and a second fluid container, said method comprising: providing a body portion 160 defining an aperture configured for fluid flow through an interior of the body portion, a first fluid container 100, a second fluid container 200, a coupler 150 coupled between the first container 100 and the second container 200, the coupler 150 including: a body portion 160, the body portion defining an aperture configured for fluid flow through an interior of the body portion 160, a housing 70 having an opening therein sized to receive a flange 15 within the body portion 160, one or more indicator objects 30 contained within said flange 15, and said flange 15 has means for containing said indicator objects 30; wherein the fluid transport system is configured to permit fluid flow from the first fluid container 100 through the coupler 150 to the second fluid container 200; and wherein said indicator objects 30 make a noise, when said fluid flows through said means for containing said indicator objects 30, thereby providing audio notification 312 to a user 300 that said fluid is flowing from said first container 100 through said flange 15 sealed within the body portion 160 of said coupler 150 to said second container 200.

Further comprising: a sight glass 10; said sight glass 10 is attached to the body portion 160 of said coupler 150; and said flange 15 is positioned inside said sight glass 10, so said user 300 can see said indicator objects 30, which are visible to said user 300 looking through said sight glass 300 contained by said flange 15 having means for containing said indicator objects 30.

Wherein said indicator objects 30 will provide both visual notifications 307 and audible notifications 312 to said user 300.

Wherein said means for containing said indicator objects 30 is one or more cage walls 20 that are attached to one or more flanges 15 to create one or more cages 20. Wherein said flange 15 has a cage 20. Wherein said flange 15 has one or more cage walls 20 that are attached to said flange 15 for containing one or more indicator objects 30. Wherein said flange 15 has one or more cage walls 20 that are built into said flange 15 for containing one or more indicator objects 30. Wherein said means for containing said indicator objects 30 is a first flange and a second flange each having a cage wall 20, which are positioned adjacent to said flanges 15 to create a cage 20, and said flanges 15 are connected to said body portion 160.

Further comprising: a sight glass 10; and said flange 10 is positioned inside said sight glass 10, so said user 300 can see said indicator objects 30 contained in said cage 20, said indicator objects 30 are visible to said user 300 looking through said sight glass 10, thereby providing visual notifications 307 to said user 300.

This design is a simple product that bolts between the existing sight glass and flanges, pinching it within the piping and in the flow of the product being unloaded. It allows a driver to see inside the sight glass, a novel point. The driver can see the indicator balls bouncing around in the flow of liquid. A second novel point is that the balls bounce against an aluminum screen, making a distinct noise, an audible sound that the driver can hear. Similar to a popcorn and/or a rattling noise, that allows them to hear liquid flowing. There has never been a product with an audible response in the industry. While unloading at night or in inclement weather, being able to hear and knowing that the fuel is flowing is an incredible safety feature.

In one embodiment of this invention, the device is a screen folded in ½ that hangs down inside the manifold piping of a transport tank after the internal valve. It is pinched between the piping that leaves the internal valve and ends at the final shut off butterfly valve and folded into the sight glass pinched between the flanges. This device can be made of aluminum or stainless and holds several balls like marbles that are not effected by the material being transferred. It is folded inside the sight glass, like a taco, holding these balls into the flow of product. When the product is flowing, these balls bounce and bang against the screen in the flow. The driver can see the balls bouncing, due to they are a different color than the product. While they are bouncing, they are making this very unique sound, a rattle and/or tinkling noise that is never before heard while moving liquids. This alone is a novel invention that has never been introduced before. Audio and visual of liquid flow from a transport tank.

It is an object of the invention that the device be constructed like a taco made of aluminum or stainless steel or similar material, wherein one or more indicator balls are folded inside the taco that is positioned inside the sight glass, holding these balls into the flow of product.

It is an object of the invention to provide a cage/screen that is positioned inside a portion of the center part of the sight glass, wherein one or more indicator balls are contained inside the sight glass, holding these balls into the flow of product.

It is an object of the invention to provide a cage/screen that is positioned inside the entire center of the sight glass, wherein one or more indicator balls are contained inside the sight glass, holding these balls into the flow of product.

While the description above refers to particular embodiments of the present invention, it will be understood that many modifications may be made without departing from the spirit thereof. The presently disclosed embodiments are therefore to be considered in all respects as illustrative and not restrictive.

I claim:

1. A Liquid Flow Indicator Device comprising:
a sight glass having first end and a second end;
said sight glass has an aperture configured for a fluid to flow through an interior of said sight glass;
said sight glass has one or more cages positioned around said sight glass for containing one or more indicator objects, so a user can see said indicator objects, which are visible by said user looking through said sight glass, thereby providing visual notification to said user;
wherein when said liquid is flowing through said one or more cages and said sight glass, said indicator objects will float around inside said one or more cages, thereby providing visual notification to said user that said liquid is flowing through said one or more cages and said sight glass;
wherein when said liquid is not flowing through said one or more cages and said sight one or more glass, said indicator objects will sit still inside said one or more cages, thereby providing visual notification to said user that said liquid is not flowing through said one or more cages and said sight glass; and
wherein said one or more cages is created by bending a flange that is positioned around said sight glass to provide visual notification to said user looking through said sight glass.

2. A liquid flow indicator device of claim 1, wherein said one or more cages are positioned inside said sight glass to provide visual notification to said user looking through said sight glass.

3. A liquid flow indicator device of claim 1, wherein said indicator objects is chosen from a group consisting of steel, aluminum, aluminum alloys, titanium, plastic, rubber, carbon fiber, composite materials, or some combination thereof.

4. A liquid flow indicator device of claim 1, wherein said indicator objects is chosen from a group consisting of Spheres, Cubes, Cuboids, Ellipsoids, Cylinders, Cones, Triangular Prisms, Hexagonal Prisms, Triangular-based pyramids, Square based pyramids, Hexagonal Pyramids, Tetrahedrons, Octahedrons, Dodecahedrons, Cosahedron or some combination thereof.

5. A Liquid Flow Indicator Device comprising:
a sight glass having first end and a second end;
said sight glass has an aperture configured for a fluid to flow through an interior of said sight glass;
said sight glass has one or more cages positioned around said sight glass for containing one or more indicator objects, so a user can see said indicator objects, which are visible by said user looking through said sight glass, thereby providing visual notification to said user;
wherein when said liquid is flowing through said one or more cages and said sight glass, said indicator objects will float around inside said one or more cages, thereby providing visual notification to said user that said liquid is flowing through said one or more cages and said sight glass;
wherein when said liquid is not flowing through said one or more cages and said sight glass, said indicator objects will sit still inside said one or more cages, thereby providing visual notification to said user that said liquid is not flowing through said one or more cages and said sight glass; and
wherein said one or more cages is created by positioning a first flange around said first end of said sight glass and a second flange around said second end of said sight glass, said first flange and said second flange each have a cage wall for containing said indicator objects, when said liquid flows through said sight glass.

6. A liquid flow indicator device of claim 5, wherein said one or more cages are positioned inside said sight glass to provide visual notification to said user looking through said sight glass.

7. A fluid transport system, comprising:
a first container;
a second container;
a coupler coupled between the first container and the second container, the coupler including: a body portion, the body portion defining an aperture configured for a fluid to flow through an interior of the body portion;
a housing having an opening therein sized to receive a sight glass; said sight glass has an aperture configured for the fluid to flow through an interior of said sight glass; one or more indicator objects contained within said housing; and said housing has means for containing said indicator objects;
said housing is attached to said coupler;
wherein the fluid transport system is configured to permit fluid flow from the first container through the coupler to the second container;
wherein said fluid flows through said means for containing said indicator objects in said housing of said body portion of said coupler, said indicator objects will bounce around, thereby providing audible notification to a user that said fluid is flowing from said first container through said sight glass sealed in the body portion of said coupler to said second container;

wherein said indicator objects are positioned in said sight glass and when said fluid flows through said means for containing said indicator objects in said housing of said coupler, thereby providing visual notification to said user that said fluid is flowing from said first container through said sight glass sealed in the body portion of said coupler to said second container; and wherein said means for containing said indicator objects is a first flange and a second flange each having a cage wall, which are positioned adjacent to said flanges to create a cage, and said flanges are connected to said body portion.

8. A liquid flow indicator assembly, comprising: a body portion configured to couple between a first fluid transport segment and a second fluid transport segment, the body portion defining an aperture configured for a fluid to flow through an interior of the body portion; a housing having an opening therein sized to receive a sight glass within the body portion; one or more indicator objects contained within said housing; and said housing has means for containing said indicator objects; and wherein the fluid is configured to permit fluid flow from the first fluid transport segment to the second fluid transport segment;

wherein said fluid flows through said means for containing said indicator objects in said housing of said body portion, said indicator objects will bounce around, thereby providing audible notification to a user that said fluid is flowing from said the first fluid transport segment through said sight glass sealed in the body portion to the second fluid transport segment;

wherein said indicator objects are positioned in said sight glass and when said fluid flows through said means for containing said indicator objects in said housing of said body portion, thereby providing visual notification to said user that said fluid is flowing from the first fluid transport segment through said sight glass sealed in the body portion to the second fluid transport segment; and wherein said means for containing said indicator objects is a flange, which is bent to create a cage, and said flange is connected to said body portion.

9. A liquid flow indicator assembly, comprising: a body portion configured to couple between a first fluid transport segment and a second fluid transport segment, the body portion defining an aperture configured for a fluid to flow through an interior of the body portion; a housing having an opening therein sized to receive a sight glass within the body portion; one or more indicator objects contained within said housing; and said housing has means for containing said indicator objects; and wherein the fluid is configured to permit fluid flow from the first fluid transport segment to the second fluid transport segment;

wherein said fluid flows through said means for containing said indicator objects in said housing of said body portion, said indicator objects will bounce around, thereby providing audible notification to a user that said fluid is flowing from said the first fluid transport segment through said sight glass sealed in the body portion to the second fluid transport segment;

wherein said indicator objects are positioned in said sight glass and when said fluid flows through said means for containing said indicator objects in said housing of said body portion, thereby providing visual notification to said user that said fluid is flowing from the first fluid transport segment through said sight glass sealed in the body portion to the second fluid transport segment; and wherein said means for containing said indicator objects is a first flange and a second flange each having a cage wall, which are positioned adjacent said sight glass so said flanges will create a cage around said sight glass, and said flanges are connected to said body portion.

10. A method for monitoring liquid flow in a body portion configured to couple between a first fluid container and a second fluid container, said method comprising: providing:
a first fluid container,
a second fluid container,
a coupler coupled between the first container and the second container, the coupler including: a body portion, the body portion defining an aperture configured for fluid flow through an interior of the body portion,
a housing having an opening therein sized to receive a sight glass within the body portion of the coupler,
one or more indicator objects contained around said sight glass, and
said sight glass has means for containing said indicator objects;

wherein the fluid transport system is configured to permit fluid flow from the first fluid container through the coupler to the second fluid container; and wherein said indicator objects make a noise, when said fluid flows through said means for containing said indicator objects, thereby providing audio notification to a user that said fluid is flowing from said first container through a flange sealed within the body portion of said coupler to said second container; and wherein said means for containing said indicator objects is said flange, which is bent to create a cage, and said flange is connected to said body portion.

11. A method for monitoring liquid flow in a body portion configured to couple between a first fluid container and a second fluid container, said method comprising: providing:
a first fluid container,
a second fluid container,
a coupler coupled between the first container and the second container, the coupler including: a body portion, the body portion defining an aperture configured for fluid flow through an interior of the body portion,
a housing having an opening therein sized to receive a sight glass within the body portion of the coupler,
one or more indicator objects contained around said sight glass, and
said sight glass has means for containing said indicator objects;

wherein the fluid transport system is configured to permit fluid flow from the first fluid container through the coupler to the second fluid container;

wherein said indicator objects make a noise, when said fluid flows through said means for containing said indicator objects, thereby providing audio notification to a user that said fluid is flowing from said first container through a flange sealed within the body portion of said coupler to said second container; and wherein said means for containing said indicator objects is a first flange and a second flange each having a cage wall, which are positioned adjacent said sight glass so said flanges will create a cage around said sight glass, and said flanges are connected to said body portion.

12. A fluid transport system, comprising:
a first container;
a second container;

a coupler coupled between the first container and the second container, the coupler including: a body portion, the body portion defining an aperture configured for a fluid to flow through an interior of the body portion;

a housing having an opening therein sized to receive a sight glass; said sight glass has an aperture configured for the fluid to flow through an interior of said sight glass; one or more indicator objects contained within said housing; and said housing has means for containing said indicator objects;

said housing is attached to said coupler;

wherein the fluid transport system is configured to permit fluid flow from the first container through the coupler to the second container;

wherein said fluid flows through said means for containing said indicator objects in said housing of said body portion of said coupler, said indicator objects will bounce around, thereby providing audible notification to a user that said fluid is flowing from said first container through said sight glass sealed in the body portion of said coupler to said second container;

wherein said indicator objects are positioned in said sight glass and when said fluid flows through said means for containing said indicator objects in said housing of said coupler, thereby providing visual notification to said user that said fluid is flowing from said first container through said sight glass sealed in the body portion of said coupler to said second container; and wherein said means for containing said indicator objects is a flange, which is bent to create a cage, and said flange is connected to said body portion.

* * * * *